US006967565B2

(12) United States Patent  (10) Patent No.: US 6,967,565 B2
Lingemann  (45) Date of Patent: Nov. 22, 2005

(54) BUILDING AUTOMATION SYSTEM

(75) Inventor: Ronald R. Lingemann, Boulder, CO (US)

(73) Assignee: HX LifeSpace, Inc., Broomfield, CO (US)

( * ) Notice: Subject to any disclaimer, the term of this patent is extended or adjusted under 35 U.S.C. 154(b) by 134 days.

(21) Appl. No.: 10/608,828

(22) Filed: Jun. 27, 2003

(65) Prior Publication Data

US 2004/0267385 A1    Dec. 30, 2004

(51) Int. Cl.[7] .......................................... H04M 11/04
(52) U.S. Cl. ..................... 340/310.01; 340/825.52; 340/286.02; 700/17; 700/19; 700/20; 700/22; 700/83; 700/276; 700/297; 715/740; 715/866
(58) Field of Search ............................. 700/11, 17, 19, 700/20, 22, 65, 83, 286, 275–277, 297; 340/310.01, 340/825.22, 3.1, 3.9, 825.52, 286.02; 715/727, 715/733, 740, 744, 746, 747, 866

(56) References Cited

U.S. PATENT DOCUMENTS

| | | | | |
|---|---|---|---|---|
| 4,567,557 A | * | 1/1986 | Burns | 700/16 |
| 5,086,385 A | * | 2/1992 | Launey et al. | 700/83 |
| 6,029,092 A | * | 2/2000 | Stein | 700/11 |
| 6,192,282 B1 | | 2/2001 | Smith et al. | |
| 6,211,870 B1 | | 4/2001 | Foster | |
| 6,229,433 B1 | * | 5/2001 | Rye et al. | 340/310.01 |
| 6,746,161 B2 | * | 6/2004 | Imamura | 385/88 |
| 6,838,978 B2 | * | 1/2005 | Aizu et al. | 340/286.02 |
| 2001/0041982 A1 | * | 11/2001 | Kawasaki et al. | |
| 2002/0171379 A1 | * | 11/2002 | Adamson | |
| 2003/0003876 A1 | * | 1/2003 | Rumsey | |
| 2003/0011467 A1 | * | 1/2003 | Suomela | |
| 2003/0036807 A1 | * | 2/2003 | Fosler | |
| 2003/0050737 A1 | * | 3/2003 | Osann, Jr. | |
| 2003/0128539 A1 | * | 7/2003 | Liu | |
| 2003/0198938 A1 | * | 10/2003 | Murray et al. | |
| 2004/0175078 A1 | * | 9/2004 | Imamura | |
| 2004/0249711 A1 | * | 12/2004 | Walker et al. | |
| 2004/0260407 A1 | * | 12/2004 | Wimsatt | |

* cited by examiner

*Primary Examiner*—Anthony Knight
*Assistant Examiner*—Crystal J Barnes
(74) *Attorney, Agent, or Firm*—Patton Boggs LLP

(57) ABSTRACT

A building automation system including user interface units with touchscreens, power drivers, and a controller, all connected to a common trunk conductor. The power drivers are connected to the electrical devices and AC wiring. The building automation system further includes wireless remote controls that are connected to the trunk either through a user interface unit or a wireless transceiver. Any electrical device in the building may be controlled by any of the user interface units and wireless remote controls.

30 Claims, 18 Drawing Sheets

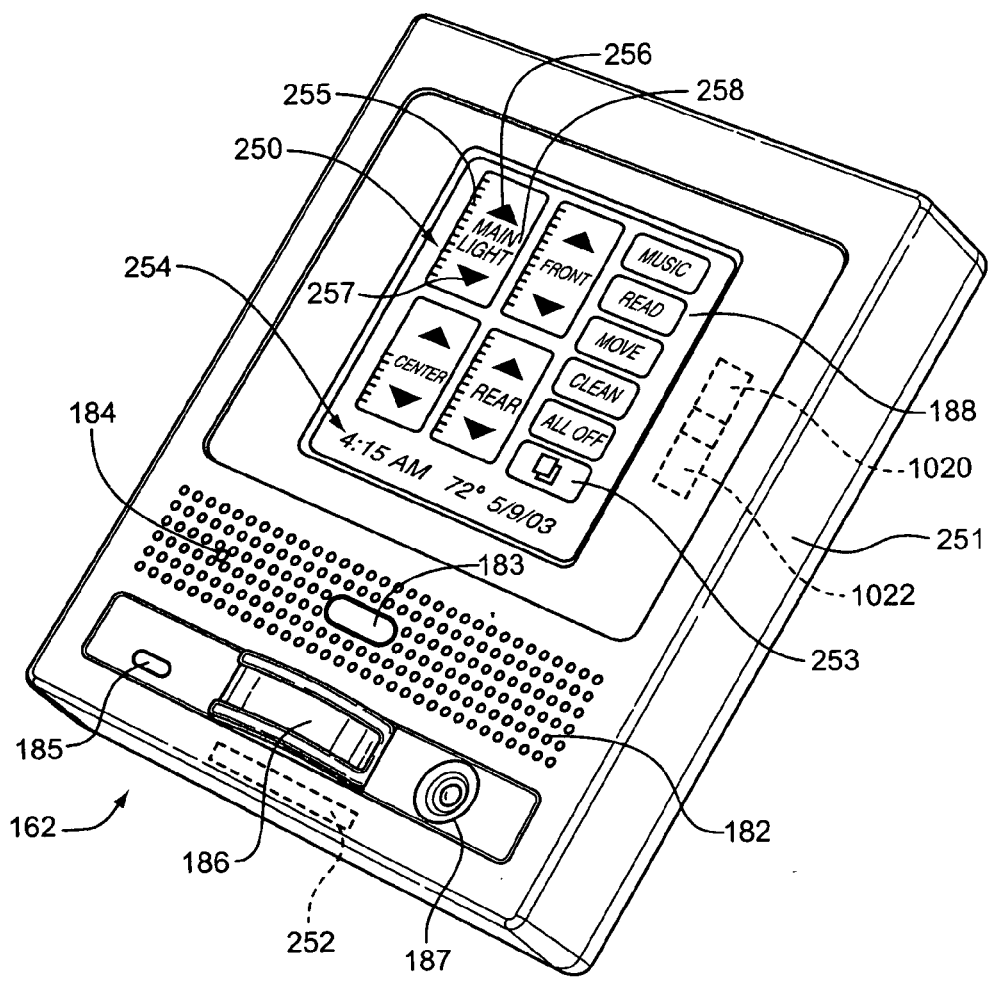
FIG. 10
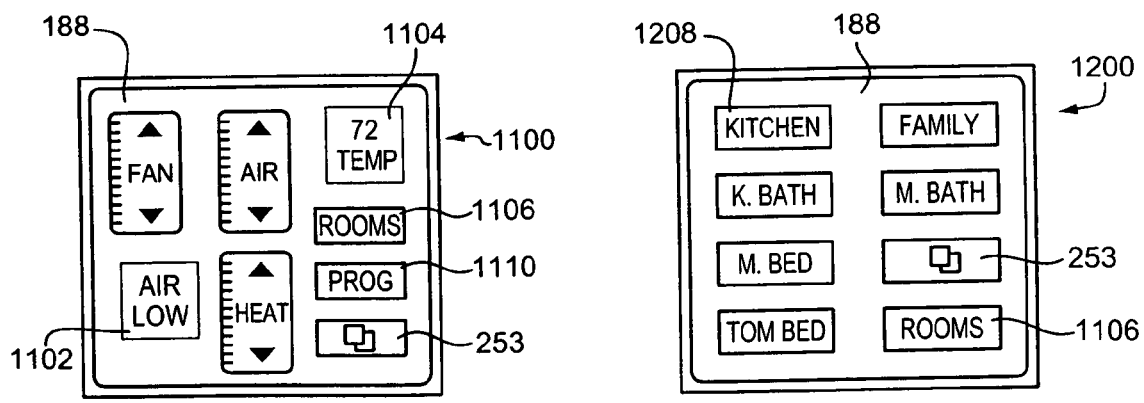
FIG. 11  FIG. 12

BUILDING AUTOMATION SYSTEM

BACKGROUND OF THE INVENTION

1. Field of the Invention

The invention in general relates to systems for controlling electrical devices in a building, and more particularly to such a system that allows the control of each electrical device in the building to be individually programmed.

2. Statement of the Problem

Over the course of the past two decades, a great change has occurred in the level of convenience provided by today's consumer products. The progress of technology has led consumers beyond wanting basic functions in their consumer products; they now want products that pamper and have features that are "intelligent."

One industry that exemplifies this new expectation is the automotive sector. As users sit in their cars, everything they need is at their fingertips. Cruise controls maintain their speed while they listen to the stereo. If a user wants to reach another person, they press a single button on their car phone, the audio mutes automatically, and they speak as if the person is sitting before them. If a user isn't sure of the route they are taking, they press another button and a map appears on a screen to their side. When they reach their destination, the car's security system is automatically armed and the door locks with one press of a button on their key chain.

Yet buildings, such as houses and commercial structures, don't offer this same level of convenience and luxury. Buildings are more varied and complex than cars, creating difficulty in producing a one-size-fits-all system. In addition, a homeowner or other building user is also not stationary, like the driver is in his car. Historically, buildings have been served by separate and dissimilar systems for the control of lighting, security, climate, entertainment, and other controls. Each system has been completely independent of the others. Later, alarm companies began to add lighting features, and lighting companies began to add HVAC features, and so on. Then companies emerged that tried to tie all these sub-systems together with yet another system. The failing in this approach was the "glue" that holds these systems together—the electronic connections and, more significantly, the programming system. The current state-of-the-art of this "glue" is such that the task of integrating these disparate functions becomes very complex and tedious.

Automation systems of today are a result of this history. They consist of separate systems for lighting, security, and HVAC, typically joined together by an extended version of a home theater remote control. Limitations arise from this approach. Since these systems were initially designed to serve a single function, the connection points to other systems or controls are limited. In turn, the degree to which a component of one system can interact with another is also limited. The number of interactions between the two systems is small. For instance, you can make a light come on when a security sensor trips, but to do this with a large number of sensor/light pairs is difficult.

Furthermore, each system has it's own programming method. To install or modify a combined system requires detailed knowledge of each individual system. This places a very high skill level requirement on potential installers. A combined system with four or five vendors means that each system must have its own backup or valuable programming information will be lost. There is no centralized backup point for these existing systems. When a change is made, the installer must be sure to remember to make a backup on the spot and to keep the system files together, further adding to the high level of complexity experienced by common installers.

In addition, all of the significant existing systems require a personal computer (PC) as part of the programming process. This means that each system must be installed on the programmer's PC and that the application must be run while connected to the system to make a change. If another system needs a change, the serial port connection must be moved to the other system and the new application must then be loaded and run, usually requiring a completely different method of programming than the previous system. If the systems utilize an advanced remote control or central touch-screen/display system, it too will be programmed in a different manner, causing the whole process to be repeated again.

Some systems use a PC as the controller. This is a natural temptation because PCs have a nice keyboard, large displays, and big hard disks. The problem is that they are highly complex and prone to crashes. The reliability of PCs is not likely to increase because both the operating systems and the applications become more and more complex. As vendors focus on new features to differentiate their products, no engineering resource is left available to improve reliability. A crashed home installation cannot be required to be "re-booted" in the middle of the night by the homeowner.

Some systems control lighting only and not security. Generally, these systems require PC programming (RS232 connection). They also include keypads-buttons/faceplates that require engraving, which requires detailed pre-construction planning to ensure keypad functions/engraving. Plus, they require large power enclosures and homeruns from each controlled device to the enclosures.

For example, U.S. Pat. No. 6,211,870 issued Apr. 3, 2001 to William Foster teaches a portable hand-held remote control which may be utilized for selecting designated functions in a plurality of remotely controllable multimedia processing units. The user-selectable screen objects are initially created from a general-purpose computer and transferred to the remote user interface unit. U.S. Pat. No. 6,192,282 issued Feb. 20, 2001 to Smith et al. teaches a building automation system that utilizes a central computer to provide instructions to devices of a building. The communications for the devices are all routed to the central computer via a large number of cables. Both these systems require a high level of programming, as well as a complex array of electronic communication lines.

Computerized systems typically coordinate communications by assigning each electronic device a unique address. One common way of handling the need for a unique address is that products are assigned a unique number during the production process, and this number is programmed into the device. A problem with this method is that it requires an extra production step that often requires specialized equipment.

Other systems are based on radio frequency (RF) technology and when these systems are maximized, they require additional transmitters/receivers to grow the system. These systems generally control lighting only and not security, plus they also require PC programming.

3. Solution to the Problem

The present invention solves the above problems with a building automation system that controls every system in a building in an integrated, consistent manner. For example, rather than looking at a switch on a wall as the control for a specific device, such as a light, a fan, a fireplace, or a sprinkler system, the present invention implements small user interfaces, such as touchscreens and wireless remote controls, each of which can control any device from anywhere in the building. The default display for the interface is a simple display that controls the devices in the room, or the part of the room, in which the user interface is located. This interface can be programmed to have any level of complexity, but typically will have the complexity of a conventional four-switch switchbox. By touching a button, the user can switch to another simple display that controls the devices in another room, or another part of the room. Thus, instead of walking around the building to operate various sets of switches, the user can stay in one place and "bring" the switches to herself or himself. This is a major change that affects the very relationship between a homeowner and his dwelling or a building tenant and the building.

The invention provides a central controller, a plurality of user interface units, and a plurality of device drivers, all connected to the same trunk conductor. The device drivers are also connected to the devices they drive and to a power supply. The central controller preferably stores all the settings for the device drivers. When a user operates a user interface, such as a touchscreen unit, the unit preferably sends data to the controller, which changes the settings for the specified device driver. Periodically, for example, every 50 milliseconds, the controller updates the settings for all drivers.

Preferably, there is a pair of trunk conductors, comprising a twisted pair of conductors. Preferably, this twisted pair is the inner pair of an eight-conductor CAT5 cable. Preferably, another twisted conductor pair of the cable straddles the inner pair and provides the system power, and the rest of the conductors provide the system ground. Preferably, there is a plurality of trunk cables in a building. Thus, if one trunk is cut or otherwise disabled after the building is built, to get the devices on that trunk up and running again, one only needs to make one connection between the disabled trunk and another trunk.

The feature of storing all control information in a single central controller, and updating it with input data that can come from any user interface and apply to any driven device, makes the system easy to use as discussed above, but also makes it easy to install. The installer does not have to have expert knowledge of any system. The installer only needs to connect a cable to the controller and route it to the junction boxes in the building. Then a user interface or driver is connected to each junction box as needed. This portion of the installation is, in fact, as simple or simpler than installing a conventional AC wiring system. Someone knowledgeable about the programming of the system can then proceed to program the system.

If a builder is building many similar or identical living units, such as a tract of townhouses or apartments, the installation becomes even simpler. Someone knowledgeable about programming the system programs one living unit, then the programming is copied to the other units. Preferably, a memory card is inserted into a memory card slot in the controller, and the controller automatically downloads the programming. The memory card is then inserted into the controller in another living unit, and the programming is, preferably, uploaded to all the interfaces, drivers, and the controller of that unit.

The invention provides a building automation system comprising: a plurality of programmable user interface units, each of the user interface units located in a room or associated area of a building; a plurality of power drivers, each of the power drivers located in a room or associated area of the building; a controller comprising a processor and a memory; and an electrical signal trunk connected to the controller; wherein each of the user interface units and each of the power drivers are connected to the electrical signal trunk. Preferably, the user interface units include a touchscreen. Preferably, each of the user interface units is capable of controlling each of the power drivers via the controller. Preferably, the building automation system further includes an electrical circuit panel and an electrical power conductor connected between the electrical circuit panel and each of the power drivers. Preferably, the electrical signal trunk is a low voltage control wiring, and most preferably, CAT5 cable. Preferably, the building automation system includes a plurality of electrical devices, each of the electrical devices electrically connected to one of the power drivers, the electrical devices comprising a plurality of different types of devices selected from the group consisting of lighting fixtures, fans, security systems, audio/video systems, heating systems, air conditioning systems, garage doors, garage door sensors, doorbells, window controls, sprinkler controls, garage door openers, electronic gate openers, driveway heaters, sidewalk heaters, fireplace controls, intercoms, speakers, microphones, dampers, digital cameras, hot water heaters, telephones, aquarium controls, water feature controls, pool/spa controls, fire protection systems, thermostats, and switched outlets. Preferably, the user interface units include a button separate from the touchscreen, the button adapted to control an electrical device in the room or associated area in which the user interface unit is located. Preferably, the electrical device is a lighting fixture, and the system a light for illuminating the button. Preferably, the system includes two types of wireless remote control, IR and RF, wherein the IR wireless remote control controls only the electrical devices in the room in which it is located, and the RF wireless remote control can control devices in any room of the structure. Preferably, the IR wireless remote control further includes a selector button, wherein operating the selector button changes the electrical device controlled by the wireless remote control. Preferably, the IR wireless remote control further includes up/down buttons, wherein selecting the up/down buttons adjusts the electrical output to the selected electrical device. Preferably, the IR wireless remote control further includes a flashlight and a flashlight activation button. Alternatively, the invention also provides a third type of wireless remote control, which transmits radio frequency (RF) signals as well as infrared (IR) signals, allowing the features of the two basic types to be combined. Preferably, the touchscreen displays a scene screen object for controlling a plurality of the electrical devices with a single touch. Preferably, the touchscreen displays a program screen object enabling the user to program any controllable electrical device in the building or associated areas. Preferably, the touchscreen displays screen objects for accessing three or more functions selected from the group consisting of: time, date, temperature, weather, security, intercom, audio, and sprinklers. Preferably, the user interfaces include a level control for controlling the level of power applied to an electrical device. Preferably, the level control includes a bar graph device for indicating the power level at which the level control is set. Preferably, the touchscreen displays a rooms screen object for displaying a listing of the rooms and associated areas of the building. Preferably, the touchscreen displays a screen object for displaying a list of all controllable electrical devices in the rooms and associated areas of the building.

In another aspect, the invention provides a building automation system comprising: a controller comprising a microprocessor and a memory; a plurality of programmable user interface units, each of the user interface units located in a room in a building; each user interface unit comprising: a touchscreen, a speaker, and a microphone; each user interface unit is capable of controlling an electrical device in a room in which the controller is located; and each user interface unit is capable of controlling an electrical device in a room different than the room in which the controller is located. Preferably, each user interface unit further includes a camera. Preferably, each user interface unit further includes a motion detector.

In a further aspect, the invention provides a building automation system comprising: a plurality of programmable user interface units, each of the user interface units located in a different room in a building; and each user interface unit is capable of controlling three or more appliances selected from the group consisting of lighting fixtures, fans, security systems, audio/video systems, heating systems, air conditioning systems, garage doors, doorbells, window controls, sprinkler controls, garage door openers, electronic gate openers, driveway heaters, sidewalk heaters, fireplace controls, intercoms, speakers, microphones, dampers, digital cameras, hot water heaters, telephones, aquarium controls, water feature controls, pool/spa controls, fire protection systems, thermostats, and switched outlets.

In still a further aspect, the invention provides a user interface unit for a building automation system, the user interface unit comprising: a touch screen; a speaker; a microphone; and control electronics capable of controlling three or more appliances selected from the group consisting of lights, fans, security systems, audio systems, heating systems, air conditioning systems, garage doors, doorbells, window controls, sprinklers, fireplaces, intercoms, and thermostats. Preferably each user interface unit further comprises an occupancy sensor. Preferably, each user interface unit further comprises a camera.

In yet another aspect, the invention provides a user interface unit for controlling an appliance in a selected room in a building, the user interface unit comprising: a graphical display; a memory for storing a plurality of displays to be displayed on the graphical display, the plurality of displays including a selected room display suitable for controlling the appliance in the selected room and at least one display suitable for controlling an electrical appliance in a room different than the selected room; a room button on the user interface unit; and a processor responsive to the room button for displaying the selected room display. Preferably, the selected room is the room in which the user interface unit is located. Preferably, the button is on the graphical display.

The invention also provides a method of controlling a selected electrical appliance located in a first room in a building, the method comprising: pressing a program screen object on a touchscreen user interface unit located in a second room different than the first room; responsive to the pressing, displaying on the touchscreen user interface unit a list of a plurality of appliances in the building and an indication of which room in the building in which each of the appliances is located; touching the screen to select the selected appliance from the list, responsive to the selecting, displaying on the touchscreen a list of attributes of the selected appliance; and programming the attributes. Preferably, the method further includes automatically arranging buttons showing the attributes on the screen. Preferably, the method further provides after the programming, touching a room screen object on the screen, and responsive to the touching the room key, displaying a screen including a control button for an appliance in the second room. Preferably, the list of appliances includes two or more appliances selected from the group consisting of lighting fixtures, fans, security systems, audio/video systems, heating systems, air conditioning systems, garage doors, doorbells, window controls, sprinkler controls, garage door openers, electronic gate openers, driveway heaters, sidewalk heaters, fireplace controls, intercoms, speakers, microphones, dampers, digital cameras, hot water heaters, telephones, aquarium controls, water feature controls, pool/spa controls, fire protection systems, thermostats, and switched outlets.

The invention further provides a product for controlling a selected electrical appliance located in a first room in a building, the product comprising: instructions for directing a processing unit to: display a program screen object; receive an input that the program screen object has been activated; responsive to the input, display a list of a plurality of appliances in the building and an indication of which room in the building in which each of the appliances is located; receive an input identifying a selected appliance on the list; display a list of attributes of the selected appliance; receive a value for a selected attribute; and communicate a signal for setting the selected attribute of the selected appliance in accordance with the value; and a media readable by the processing unit that stores the instructions.

In a further aspect, the invention provides a method of controlling at least three different appliances in a building having at least three rooms, each of the three appliances being in a different one of the rooms, the method comprising: entering any one of the three rooms; and operating a touchscreen control panel in the entered room to control any one of the three appliances. Preferably, the operating comprises: selecting a screen object corresponding to a selected appliance; and utilizing the selected screen object to control the selected appliance.

In yet a further aspect, the invention provides a method of programming a building automation system comprising: a plurality of programmable user interface units, each user interface unit located in a different room of a building; a controller; and an electrical signal trunk connecting the controller and the user interface units; the method comprising: electrically connecting a non-volatile memory unit storing a program to the controller; the controller recognizing that the non-volatile memory contains a program appropriate for programming the control system; and the controller uploading the program into each of the user interface units. Preferably, the recognizing comprises: the controller recognizing that the programmable appliance user interface units do not contain a program; and the controller recognizing that the non-volatile memory unit stores a program appropriate for the user interface units. Preferably, the recognizing comprises the controller recognizing that the non-volatile memory unit stores an update to a program stored in the user interface units; and the uploading comprises the controller updating the program in the user interface units. Preferably, the electrically connecting comprises engaging a plug/socket connected to the non-volatile memory with a plug/socket connected to the controller.

The invention also provides a method of backing up a building automation system comprising: a plurality of programmable appliance user interface units, each user interface unit located in a different room of a building; a controller; and an electrical signal trunk connecting the controller and the user interface units; the method comprising: electrically connecting a non-volatile memory unit storing to the controller; the controller recognizing that the non-volatile memory is blank; and the controller downloading data from the user interface units to the non-volatile memory. Preferably, the electrically connecting comprises engaging a plug/socket connected to the non-volatile memory with a plug/socket connected to the controller.

The invention also provides a method of installing a building automation system in a building having a circuit panel including a plurality of electrical power lines, a first electrical device installed in a first room in the building, a second electrical device installed in a second room in the building, the method comprising: installing a first user interface unit in the first room and a second user interface unit in the second room; electrically connecting the first user interface unit and the second user interface unit to a controller having a CPU and a memory; electrically connecting the first electrical device to a first power driver and the second electrical device to a second power driver; electrically connecting the first user interface unit to the first power driver and the second user interface unit to the second power driver; and using the plurality electrical power lines to supply power to the first power driver and the second power driver.

In still a further aspect, the invention provides a method of programming a building automation system comprising: providing a first building automation system in a first building; programming the first building automation system; providing a second building automation system in a second building; and copying the programming of the first building automation system to the second building automation system. Preferably, the copying comprises copying the programming of the first building automation system to a removable medium; transporting the removable medium to the second building; and copying the programming of the first building automation system from the removable medium to the second building automation system.

The invention also provides a slave device for use in a building automation system, the slave device comprising: a memory; a processor; a signal input/output for connecting the processor to an electrical signal trunk; a touchscreen display; and a room button separate from the touchscreen display for controlling an electrical device.

In a further aspect, the invention provides a slave device for use in a building automation system, the slave device comprising: a memory; a processor; a signal input/output for connecting the processor to an electrical signal trunk; a touchscreen display; and software or firmware stored in the memory for causing the touchscreen to display a screen object for listing the electrically controllable devices in the rooms and associated areas in the building.

In yet another aspect, the invention provides a slave device for use in a building automation system, the slave device comprising: a memory; a processor; a signal input/output for connecting the processor to an electrical signal trunk; a touchscreen display; and software or firmware stored in the memory for causing the touchscreen to display a screen object for listing the rooms and associated areas in the building.

The invention also provides a remote control device for use in a building automation system, the remote control device comprising: a memory; a processor; a selector key for selecting a function to be controlled; a display for displaying an indication of the function to be controlled; and an up/down key for controlling the function. Preferably, the remote control further includes a flashlight.

The invention also provides a level control for use in a building automation system, the level control comprising: a memory; a processor; a signal input/output for connecting the processor to an electrical signal trunk; an infrared receiver; and a level control indicator to indicate the level at which the level control is set.

In still another aspect, the invention provides a slave device for use in a building automation system, the slave device comprising: a memory containing a protective code; a processor; a trunk output connected to the processor; and software or firmware directing the processor to output the code on the trunk output in response to a predetermined signal received on the trunk. Preferably, the slave device is a device selected from the group consisting of a touchscreen user interface, a remote user interface, a level control device, and a power driver.

In yet another aspect, the invention provides a method of doing business comprising: licensing an electronic system technology to a licensee, the electronic system including an electronic slave device and an electronic controller; assigning the licensee a protective code; storing in the controller software or firmware instructing the controller to: receive the protective code from the slave device; and not recognize or communicate with the slave device if the code is not received. Preferably, the electronic system is a building automation system. Preferably, the process of receiving the protective code includes sending a message from the controller to the slave device and receiving the protective code in response to the message.

In yet a further aspect, the invention provides a method of enforcing copyright protection for software or firmware, the method comprising: providing an electronic system including a system controller and an electronic device, the system controller including a processor and a memory, the electronic device including protectable software or firmware; the memory including instructions to cause the processor not to communicate with or recognize the device if the software or firmware does not include a proper copyright notice. Preferably, the system requires a working address for the device to communicate with the controller, and the not communicating with or recognizing comprises not providing a working address to the device.

The present invention eliminates the need to access a PC to control home management features. It further eliminates the need for an "always-on" and/or dedicated PC to control home management features and eliminates program incompatibility issues running on a Windows-based PC. The present invention provides convenient access to all home management features from anywhere a user interface unit is installed. In addition, the controller is reliable, efficient and compact. Other features, objects, and advantages of the invention will become apparent from the following description when read in conjunction with the accompanying drawings.

BRIEF DESCRIPTION OF THE DRAWINGS

FIG. 10 is an illustration of a front perspective view of a user interface unit according to the invention showing a default display as may be displayed in an exemplary room in a house;

FIG. 11 is an illustration of a menu displayed upon touching the additional menu button of the menu of FIG. 10;

FIG. 12 is an illustration of a menu displayed upon touching the rooms button of the menu of FIG. 11;

DETAILED DESCRIPTION OF THE PREFERRED EMBODIMENT

1. Overview

Figure 1:
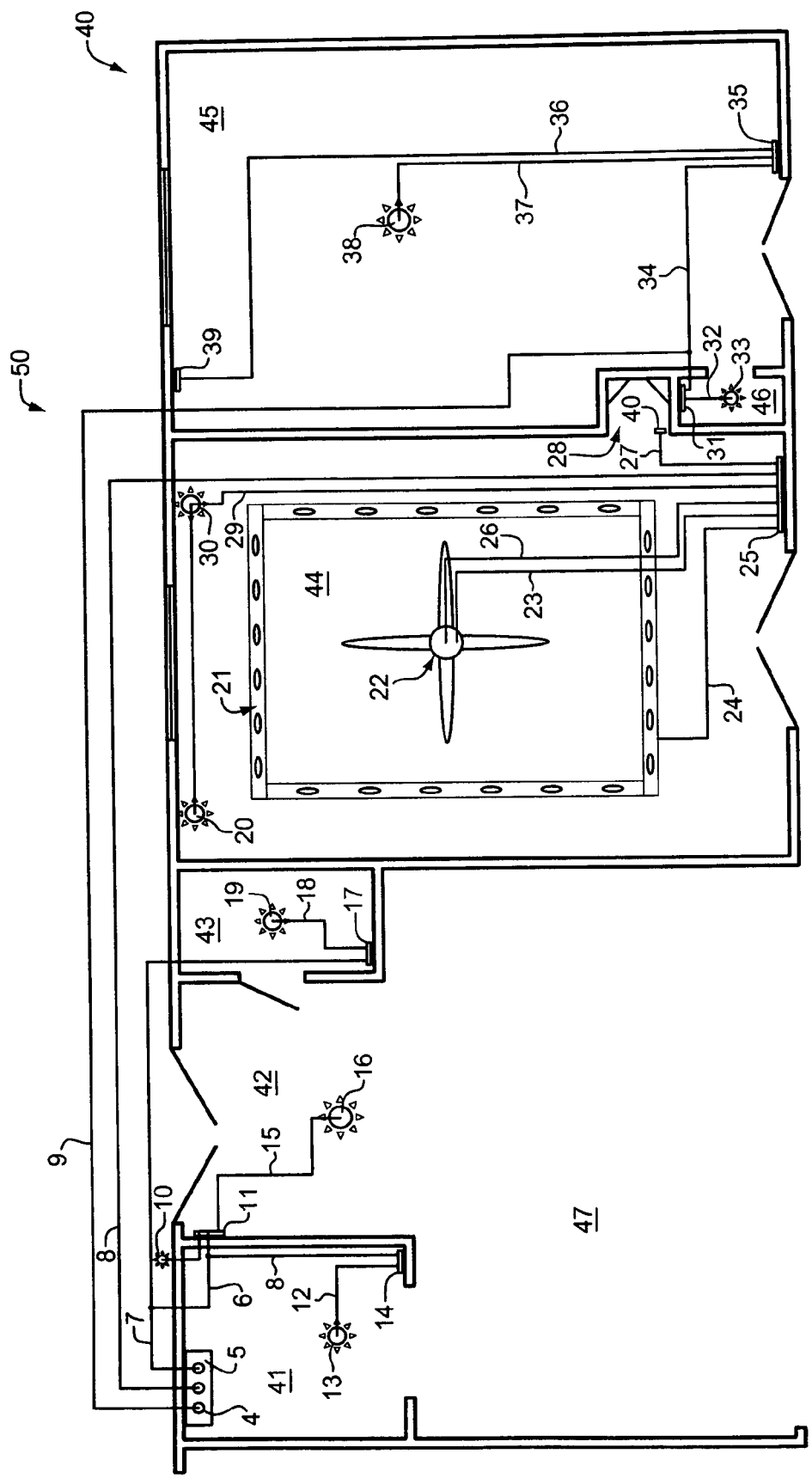
FIG. 1 is an illustration of a plan view of a conventional prior art building electrical power and control diagram with conventional switches, devices, and wirings.

FIG. 1 is an illustration of a prior art conventional wiring diagram 50 in a conventional building. In FIG. 1, the portion of building 40 shown includes a utility room 41, a foyer 42, a closet 43, a family room 44, a bedroom 45, and a bedroom closet 46. FIG. 1 also shows an area associated with the building, namely, partially enclosed patio area 47. Other areas associated with a building in which portions of a building automation system may be located are driveways, sidewalks, lawns, etc. These are not shown in FIG. 1 because of space limitations. As known in the art, many conventional utility rooms 41 include a breaker panel 5 where the incoming AC power from the power company is split into separate circuits, each with a circuit breaker 4. In this way, all of the electrical devices throughout a building are provided with electrical power. For example, AC wiring 7 exits breaker panel 5 and supplies electrical power to single wall switch 17 in closet 43 which switches electrical power on and off to closet lighting fixture 19, via AC wiring 18. In addition, AC wiring 6 splits off of AC wiring 7 and supplies electrical power to double wall switch 11 in foyer 42, which wall switch switches electrical power on and off to lighting fixture 16, via AC wiring 15. Double wall switch 11 also switches electrical power on and off to lighting fixture 10. AC wiring 6 supplies electrical power to AC wiring 8 which supplies power to a single wall switch 14 in utility room 41, which single wall switch switches the power on and off to lighting fixture 13, via AC wiring 12. Similarly, AC wiring 8 exits breaker panel 5 and supplies electrical power to a triple wall switch 25 in family room 44, which triple wall switch switches electrical power on and off to a fireplace control 40 of fireplace 28, via AC wiring 27. Also, triple wall switch 25 switches electrical power on and off to a fan with light 22, via AC wirings 23 and 26, and switches electrical power on and off to recessed ceiling lights 21, via AC wiring 24, and lighting fixtures 20 and 30, via AC wiring 29. AC wiring 9 exits breaker panel 5 and supplies electrical power to a single wall switch 31 in bedroom closet 46 which switches electrical power on and off to lighting fixture 33, via AC wiring 32. Also, AC wiring 9 supplies electrical power to a double wall switch 35 in bedroom 45, via AC wiring 34, which double wall switch switches electrical power on and off to lighting fixture 38 and switched outlet 39, via AC wirings 36 an 37.

Figure 2:
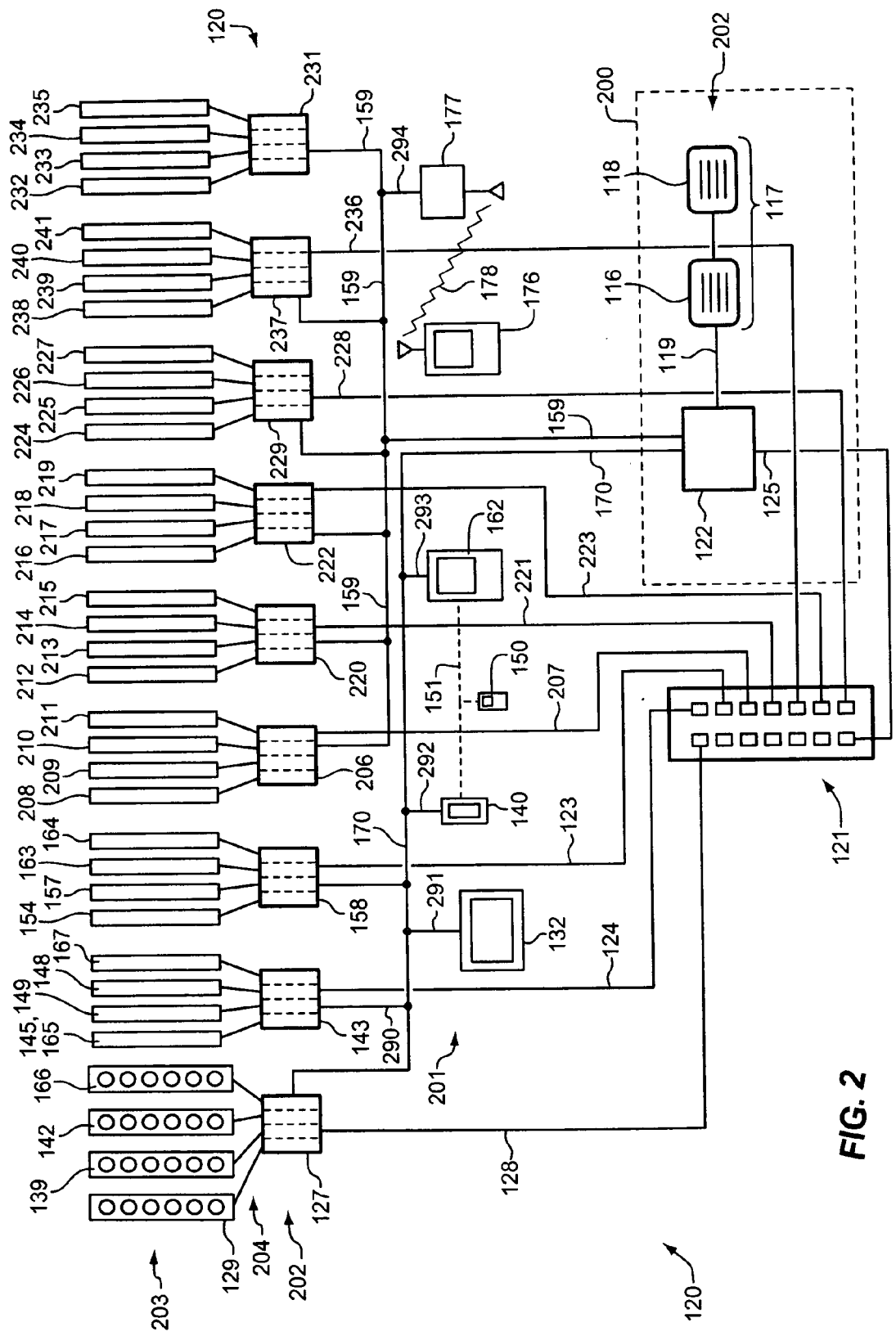
FIG. 2 is a block diagram of the building automation system according to the invention.

FIG. 2 is an illustration of a preferred embodiment of a building automation system 120 according to the present invention. Building automation system 120 comprises system control electronics 200, trunk lines 159 and 170, a plurality of user interface units 201, and a plurality of power drivers 202, which together are referred to herein as slave devices 201, 202. A plurality of electronic devices 203 are controlled by building automation system 120. System control electronics includes a controller 122 and electronic modules 117, sometimes referred to as add-on cards 117. These electronic modules 117 are typically specialized low-voltage drivers that are located in controller cabinet 172 (FIG. 6), or they may be electronic devices that perform specified functions. For example, preferably, one of the add-on cards is a WWV receiver 118 for receiving time signal broadcast from NIST. This enables building automation system 120 to have accurate time 24 hours of the day, 7 days of the week. Another preferred add-on is an audio storage memory 116, including prerecorded sounds such as dinner bells, environmental sounds such as running water and bird sounds, alarm clock sounds, grandfather/cuckoo clock sounds, and audible messages such as break alerts. Controller 122 is connected to modules 117 via bus 119, to breaker panel 121 via AC wiring 125, and to user interface units 201 and drivers 202 via trunk lines 170 and 159. Drivers 202 are connected to controlled devices 203 via AC wiring 204.

Five types of user interface units 201 are shown in FIG. 2. The primary user interface unit is, preferably, a wall mounted unit 132, 162 that is hardwired to a trunk, such as 170. These may come in several sizes, such as a large size 132 and a smaller size 162. They may also come in a tabletop unit, which includes a tripod to hold it upright and an extension cord that plugs into a wall jack. Another type of user interface unit 201 is a variable output device, which we refer to herein as a level control 140, or simply a level control. Often, a power level control 140 is referred to in the art as a "dimmer", since, when used to control lights, they can dim the lights. However, herein, level controls 140 may also control devices other than lights, such as a fan, or other aspects of the system, such as an audio level, or the temperature of a room. Generally, a level control controls the power to a device, though it may also control another electrical parameter. A further type of interface unit 201 is a wireless remote control 150, which preferably communicates with a level control 140 or a wall mounted interface unit 162 via infrared (IR) radiation 151. User interface unit 150 is preferably small, most preferably about the size of a key fob. Yet another type of user interface unit 201 is a larger wireless remote unit 176, which communicates via radio frequency (RF) radiation 178 with a transceiver 177 that is hardwired to a trunk, such as 159. Interface unit 178 is preferably about the same size as the smaller wall-mounted interface units 162. The smaller remote may be an RF remote, and the large an IR remote, or both the smaller unit 150 and the larger unit 176 may use both IR or RF. Preferably, all the interface units 201 are in some way connected to a trunk line, such as 170 or 159.

An important feature of the invention is that all slave devices 201, 202 have an electrical signal input/output 290, 291, 292, 293, 294, etc., connected to a signal trunk 159, 170, which trunk is connected to controller 122. Herein, the term "electrical signal" is used in the normal sense that includes electrical pulses that carry information; and the term "signal trunk" or simply "trunk" means a conductor that carries non-trivial information, and does not include conductors that only carry power.

Figure 3:
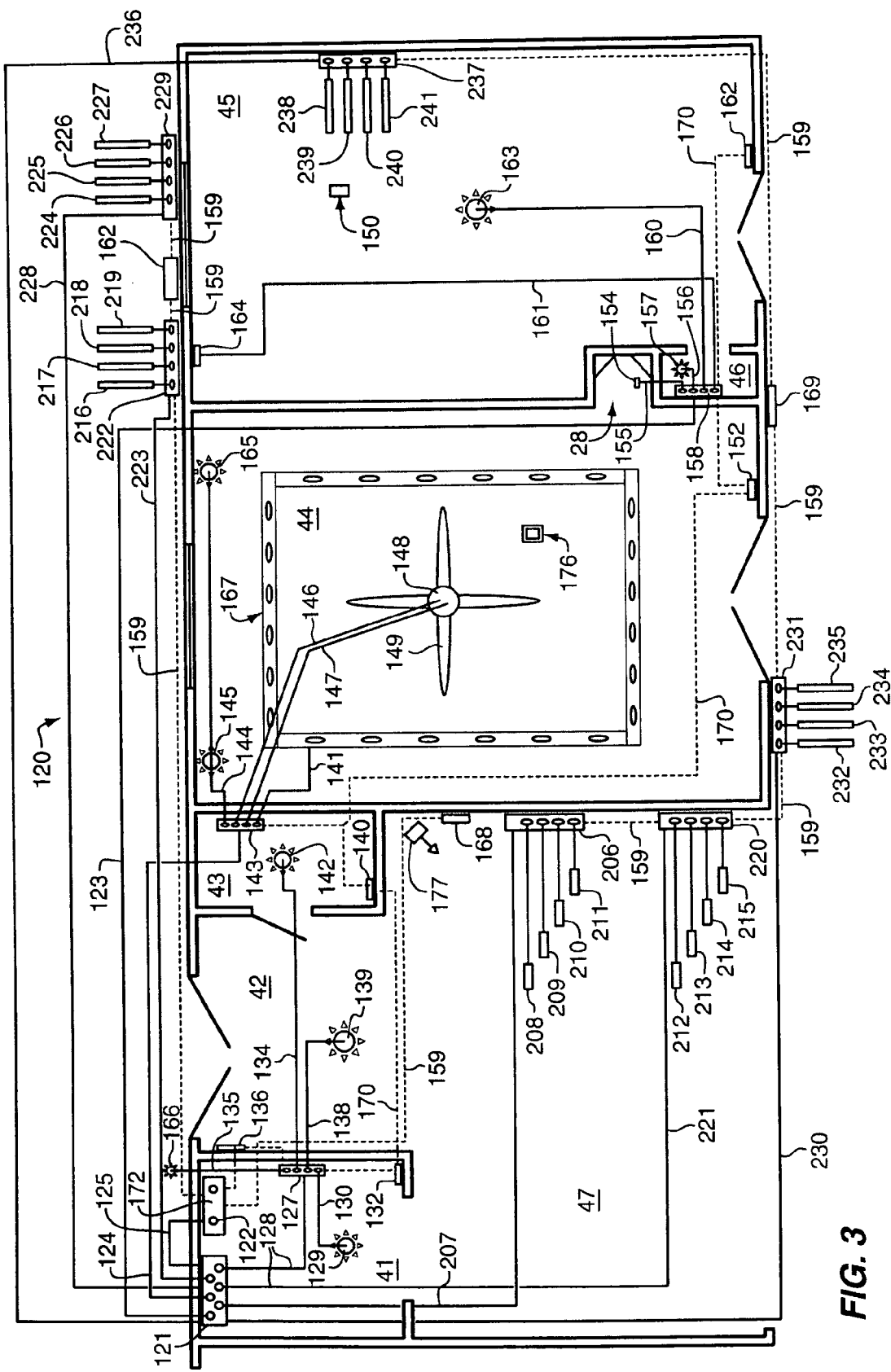
FIG. 3 is an illustration of a plan view of the building automation system according to the invention.

As will be seen in more detail in connection with the discussion of FIG. 3, controlled devices 203 may be any building devices that are capable of being electronically controlled, for example, lighting fixtures, fans, security devices, audio/video devices, heating devices, air conditioning devices, garage doors and garage door sensors, doorbells, window openers, sprinkler valves, garage door openers, electronic gate openers, driveway heaters, sidewalk heaters, fireplace controls, intercoms, speakers, microphones, dampers, digital cameras, hot water heaters, telephones, aquarium controls, water feature controls, pool/spa controls, fire protection systems, thermostats, and switched outlets. Drivers 202 may be any electronic element capable of driving a controlled device 203. Numbered elements of FIG. 2 not discussed in this paragraph will be discussed in connection with FIG. 3.

FIG. 3 is an illustration of the building automation system of FIG. 2 plus additional controlled devices installed in the building and associated building areas of FIG. 1. As indicated above, because of space limitations, not all of the building and associated building areas are shown. It is a feature of the invention that conventional building wiring, such as 8 and 9, and controlled units, such as lights 129, as shown in FIG. 1 may be incorporated into a building automation system according to the invention simply by locating a controller 122 in a cabinet 172, in a utility room 41 for example, placing user interface units, such as 132, in appropriate places within the building, preferably at least one in each room, placing drivers as necessary to drive the devices in the building, and connecting the user interface units and drivers to trunk lines, such as 170 and 159. In some embodiments, drivers already in place may be utilized with the invention. However, in the preferred embodiment, the automation system according to the invention is installed in new buildings with user interface units 201 replacing conventional switches and controls and specialized drivers 202 designed specifically for the system 120 used in place of conventional drivers.

2. Hardware and Functioning of Hardware

Figure 6:
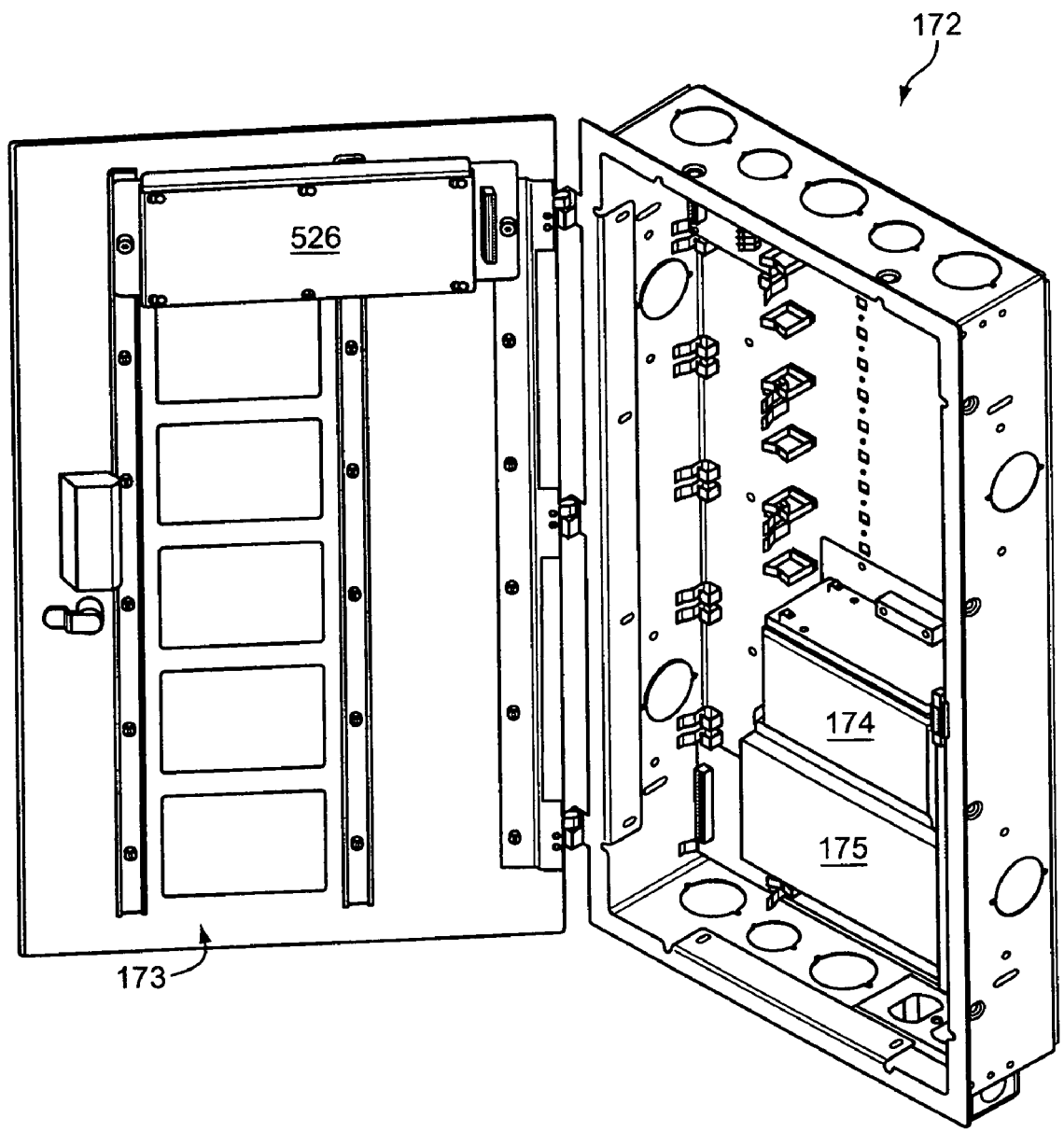
FIG. 6 is an illustration of a perspective view of a controller cabinet according to the invention.

Turning now to the details of FIG. 3, building automation system 120 includes a controller 122 connected to a breaker panel 121, via AC wiring 125. Controller 122 is preferably housed in a cabinet 172 which preferably includes at least one module bay 173, as shown in FIG. 6, for holding additional low voltage electronic driver modules 117. Breaker panel 121 provides electrical powerto drivers 127, 143, 158, 206, 220, 222, 229 231, and 237 via AC wiring 128, 124, 123, 207, 221, 230, 223, 228, and 236, respec-
tively. Power driver 127 provides controlled electrical power to lighting fixtures 129, 139, 142, and 166 via AC wiring 130, 138, 134, and 135 respectively. Power driver 143 supplies controlled electrical power to lighting fixtures 145 and 165, light 148, fan 149, recessed ceiling lights 167, via AC wiring 144, 146, 147, and 141, respectively. Power driver 158 supplies controlled electrical power to fireplace control 154 of fireplace 28, lighting fixture 157, lighting fixture 163, switched outlet 164, via AC wiring 155, 156, 160, and 161, respectively. Power driver 206 supplies controlled electrical power to shades 208 which control solar heating, windoware 209, air conditioner 210, and intercom/speaker/microphone system 211 via the indicated AC wiring. Power driver 220 provides controlled electrical power to furnace 212, air control dampers 213, hot water heater 214, and aquarium heater 215 via the indicated AC wiring. Power driver 222 provides controlled electrical power to garage doors 216, electric gate 217, heated sidewalks and driveway 218 and pool/spa heaters 219 via the indicated AC wiring. Power driver 229 provides controlled electrical power to sprinklers 224, drapes 225, door locks 226, and digital camera 227 via the indicated AC wiring. Power driver 231 provides controlled electrical power to fire detection system 232, flood monitoring system 233, humidity controller 234, and outdoor lighting 235 via the indicated AC wiring. Power driver 237 provides controlled electrical power to home theater audio/visual components 238, phone PBX 239, voice mail control 240, and doorbell 241 via the indicated AC wiring. Similarly, it is evident that any electronic or electrical device in a building can be driven by an appropriate driver.

Drivers 127, 143, 158, 206, 220, 222, 229, 231, and 237 receive the data needed to set the power level provided to the driven devices from controller 122. The data is provided to the controller by a network of user interface units 132, 140, 152, 162, 168, 169, and 176 (via transceiver 177) via low voltage control trunks 159 and 170. Specifically, user interface units 132, 140, 152, and 162 are connected with controller 122 via low voltage control trunk 170. User interface units 168, 169, and transceiver 177 are connected with controller 122 via low voltage trunk 159. In FIG. 3, the RF wireless remote control 176 is shown located in family room 44, but it can be moved throughout the building. It communicates with transceiver 177 located on patio 47. In the simplified building shown in the drawing, only one transceiver 177 is necessary. Generally, there will be several transceivers 177 placed strategically about a building so that RF wireless interface 176 anywhere in or about the building can communicate to controller 122. Also preferably, building automation system 120 includes IR wireless remote control 150 that also can be moved about a building from room to room. IR wireless remote control 150 communicates with controller 122 via user interface unit 162 located in the room in which remote control 150 is used. In FIG. 3, wireless remote control 150 is shown located in bedroom 45.

A feature of the invention is that a single control trunk, such as 170, can be used to control many devices. However, in practice, a building may include one or several control trunks 159, 170 where each trunk enables communications between that portion of the building that a particular trunk services and controller 122. Thus, if one control trunk goes down, only a portion of a building is affected, and the affected portion can be brought back on line simply by connecting its control trunk to a working control trunk at one place. If a new device is installed in a building with an automation system according to the invention, the driver for the device only needs to be connected to any available control trunk. For example, if a user wishes to install a new level control 140 in closet 46, the user simply locates the nearest control trunk and connects the level control to it. In this case, the connection can be made with either trunk 159 or trunk 170. This is so because the same data is communicating across all of the control trunks 159, 170.

Figure 4:
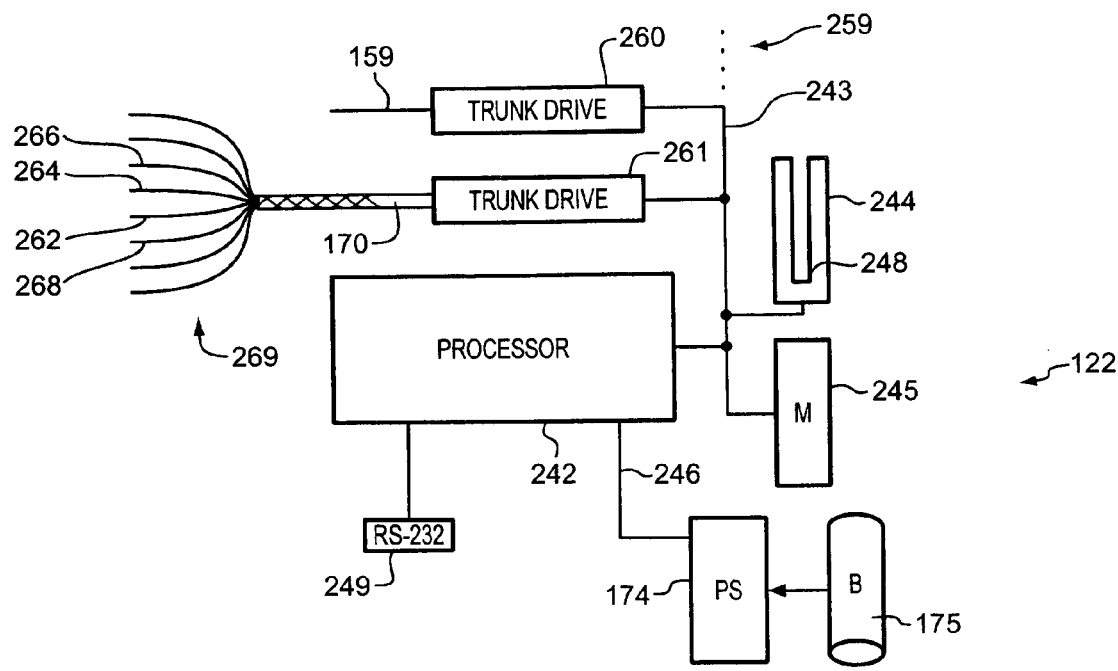
FIGS. 4 and 5 are illustrations of a controller according to the invention.

FIG. 4 is an illustration of the preferred embodiment of controller 122. Controller 122 preferably comprises an electronic processor 242, bus 243, memory connector 244, memory 245, RS-232 port 249, a small battery (not shown) to provide power to the clock, and trunk drivers 260 and 261. It also includes a connection 246 to power supply 174 and backup battery 175 in cabinet 172 (FIG. 6). Preferably, memory connector 244 includes a plug/socket 248 for connecting to a memory, such as a Flash memory. Preferably, memory 245, memory connector 244, and trunk drives 260 and 261 are connected to processor 242 via bus 243. The power supply is connected to processor 242 and to memory 245, memory connector 244 and trunk drives 260 and 261, though the latter connections are not expressly shown in FIG. 4 for clarity. In the preferred embodiment, processor 242 includes a microprocessor and a digital signal processor. The microprocessor is preferably a Microchip model PIC 185452 with embedded EEPROM and the digital signal processor is preferably a TMS 320VC5502 digital signal processor. Memory 245 preferably includes a SDRAM and a NAND FLASH memory. In the preferred embodiment, the SDRAM is a Hitachi model HM5257165 and the NAND Flash memory is a Toshiba TH58100FT. Memory connector 244 is preferably an MMC card connector such as commonly used in electronic cameras and music players. Plug/socket 248 may be either a plug adapted to connect to a socket or a socket adapted to connect to a plug. The important aspect of plug/socket 248 is that it enables quick and simple connection of a removable non-volatile memory medium, such as will be no problem for someone not skilled in computers to use. Non-volatile medium 533 (FIG. 5) may be any non-volatile memory medium, such as a hard drive, a tape, a disk, a card, etc. Trunk drives 260 and 261 are MAX drivers. They communicate at either a 250 K-baud or 500 K-baud rate, whichever is selected, with full cyclic redundancy check error checking. Power supply 246 provides 24 V DC power from a conventional 110–120 V AC input, and battery 175 provides 24 V DC backup power and is rechargeable. While only two trunks are expressly shown in FIG. 4, dots 259 represent four additional trunk drivers and trunk lines in the preferred embodiment for a total of six. Each trunk preferably is capable of driving 50 devices. The invention contemplates a slave controller (not shown), which can be included in building automation system 120, particularly in large buildings. In this case, the slave controller would be located on one trunk, and have a plurality of additional trunks attached to it. However, the building automation system is preferably designed for one controller 122.

FIG. 4 also illustrates the structure of the preferred embodiment of a trunk line 170. Preferably, trunk line 170 is a CAT5 unshielded cable, which, as is known in the art, includes eight conductors in four twisted pairs of conductors. Preferably, center twisted pair 262 and 264, which are the four and five conductors of the CAT5 cable, provides an RS422 communication line. As is known in the art, an RS422 line comprises a twisted pair with one conductor high and the other low. The second twisted pair, 266 and 268, which are the three and six conductors of the CAT5 cable, provide the system 24 V DC power. The other conductors 269, i.e., the one and two and the seven and eight conductors of the CAT5 cable, provide the system ground. Preferably, each of conductors 262, 264, 266, 268, and 269 connect to every hardwired user interface 132, 140, 162 and each transceiver 177 along the trunk and to every driver 202 along the trunk.

Figure 5:
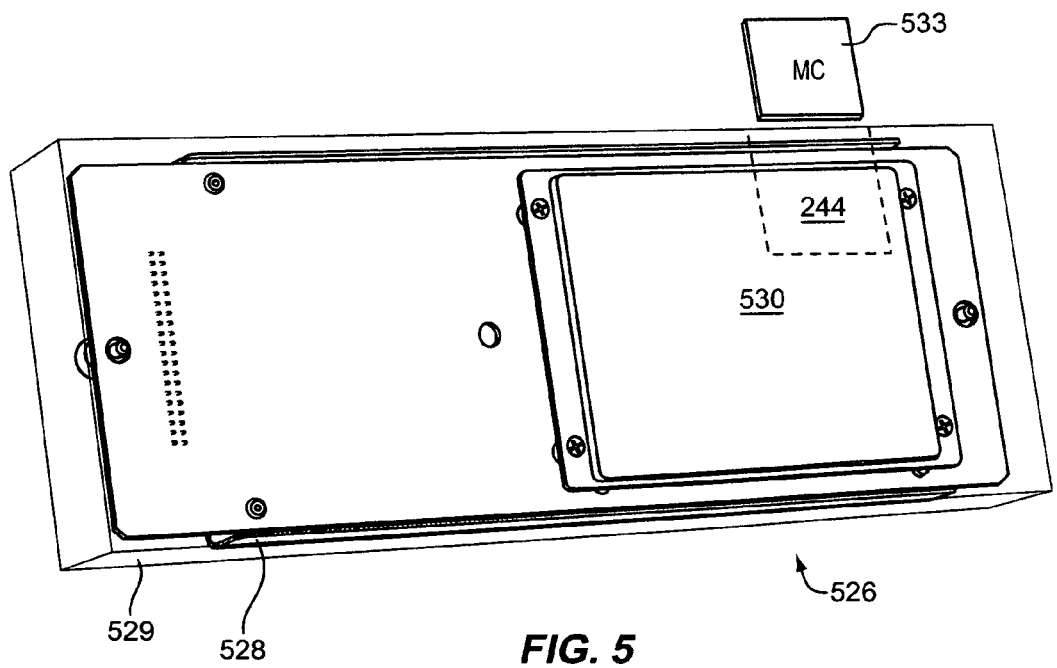

FIG. 5 is an illustration of controller module 526. Controller module 526 preferably includes memory connector 244, a UL-rated circuit board 528 including controller 122, anodized aluminum case 529, and UL-rated plastic faceplate 530. An MCC flash memory card 533 is shown ready to be inserted into memory connector 244.

FIG. 6 is an illustration of an electronics cabinet 172 with a controller module 526 installed. In the preferred embodiment, electronics cabinet 172 is a conventional metal electronics cabinet with six module bays 173. If a user desires to highlight the technical aspects, the cabinet can be stainless steel or some other metal and be placed in a hallway; however, any form of electronics cabinet with any number of module bays 173 can be used. Module bays 173 are used for controller module 526 and driver modules 117 (FIG. 2) that are not distributed elsewhere in the building. While the standard driver has four driver stages or channels, as discussed below, the invention contemplates that some drivers will have many more. For example, a security driver module may have a dozen or more drivers to drive all the security devices, such as detectors and cameras, in a large building. Alternatively, several four-channel drivers may be used to provide a complex function such as security. Also included in control cabinet 172 is a power supply 174 and battery backup 175. When installing a new system in a building, upgrade bays can be labeled for future systems to be installed and wiring for such upgrades installed at the time of construction of the building.

Figure 7:
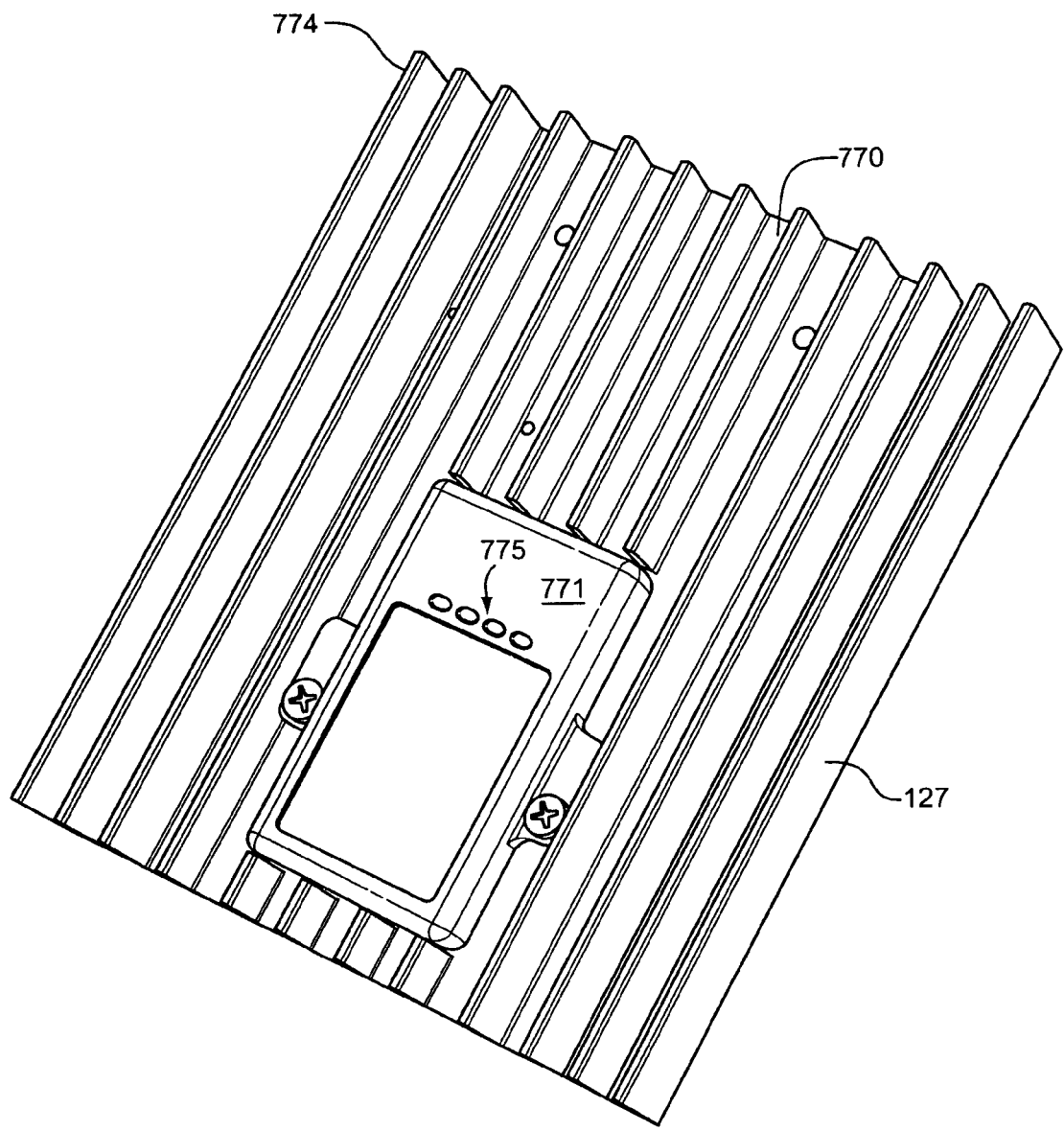
FIG. 7 is an illustration of a perspective front view of a power driver according to the invention.
Figure 8:
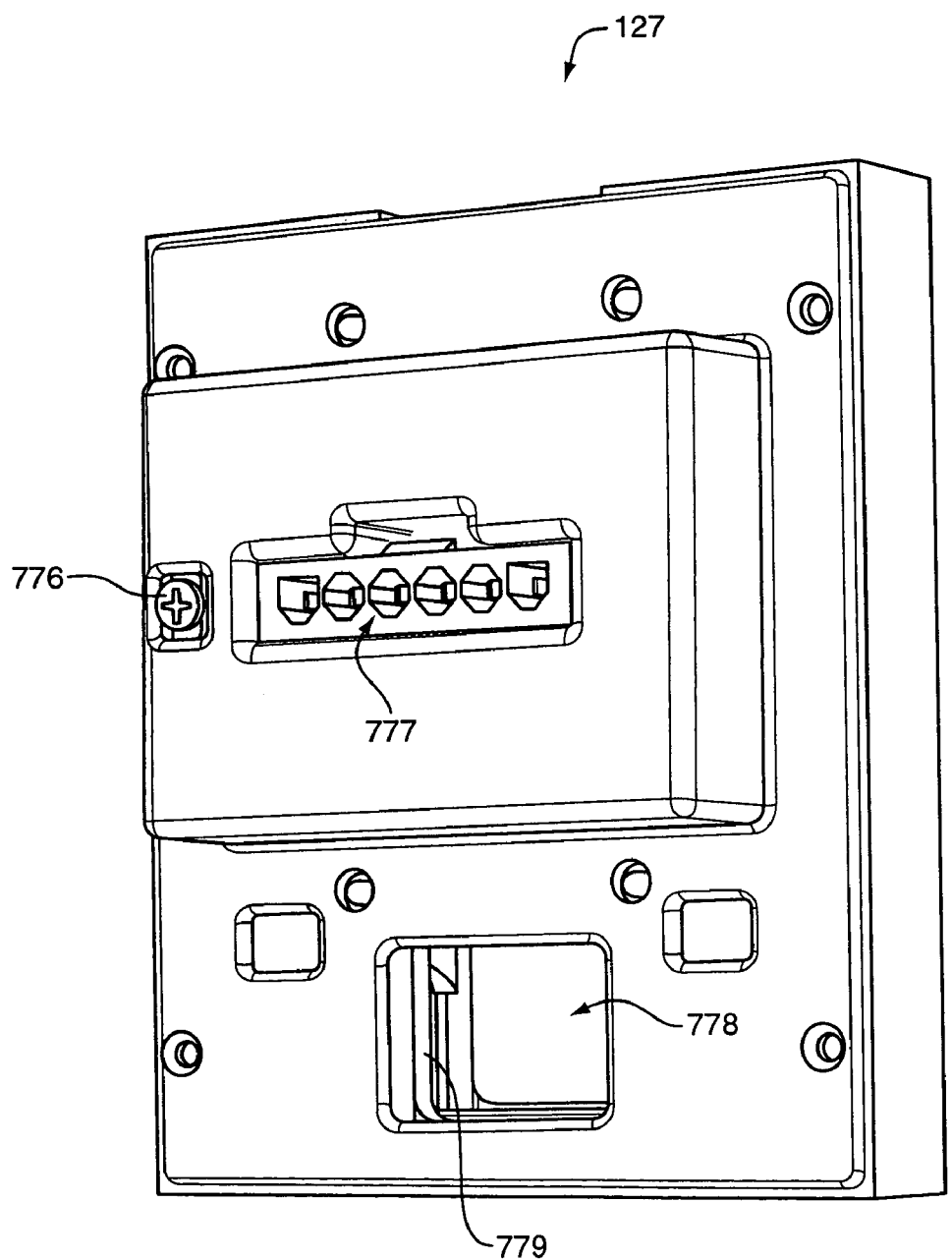
FIG. 8 is an illustration of a perspective back view of a power driver according to the invention.
Figure 9:
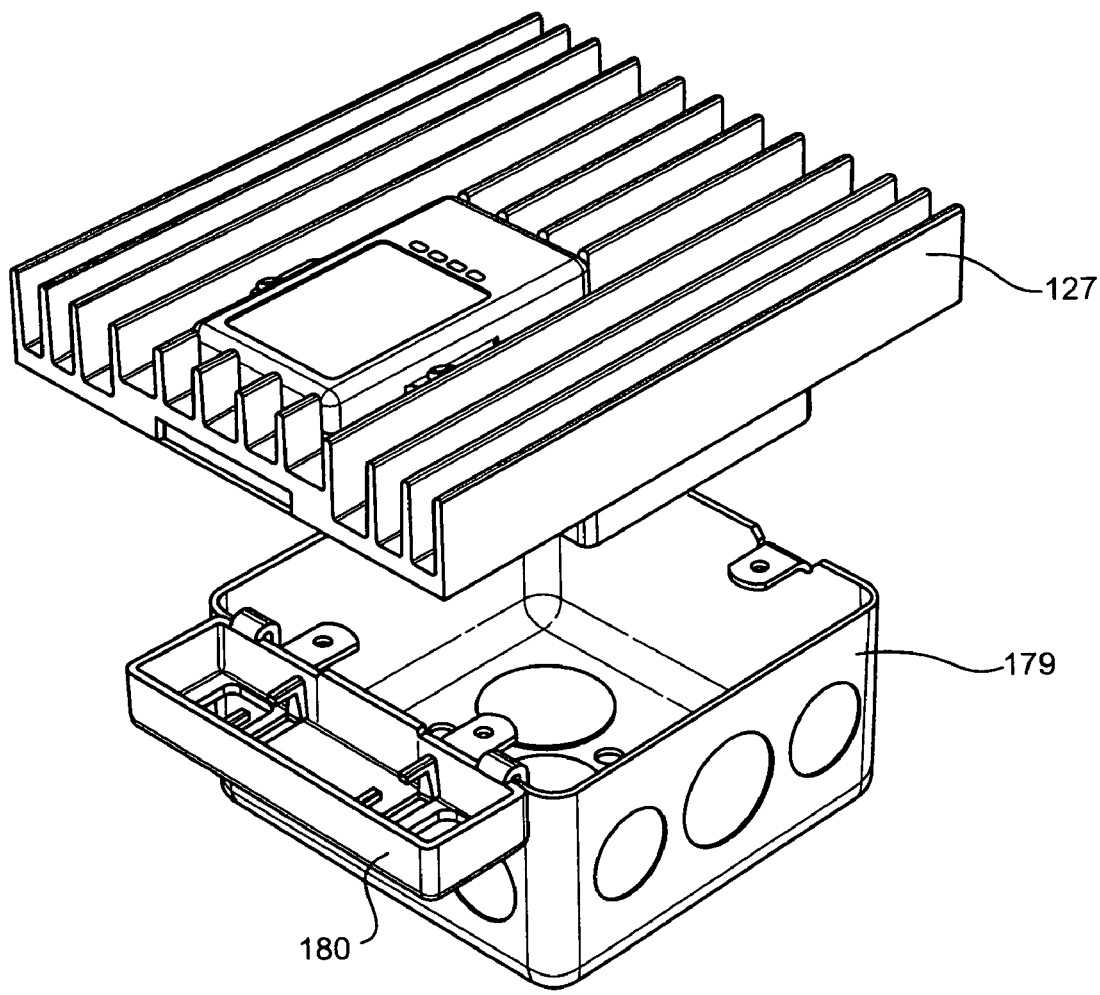
FIG. 9 is an illustration of an exploded view of a power driver and double wall outlet box according to the invention.

FIG. 7 is an illustration of the front or room side of an exemplary power driver 127, and FIG. 8 is an illustration of the back or wall side of power driver 127. FIG. 9 shows an exploded view of a power driver 127 over a double wall outlet box 179. Drivers, such as 127, are contact closure and low voltage relay modules that provide combinations of input/output contacts. Power drivers come in various sizes to fit the needs of a building, but preferably they are 15-Amp, 1800 Watts/120 Volts and direct electrical power to a plurality of devices, preferably four. Power drivers 127 are designed to fit a standard double-gang electrical box 179. Power driver 127 preferably includes an extruded anodized aluminum face 770 having a plurality of cooling fins 774 for dissipating heat and a UL-rated plastic housing 771 with a UL-rated circuit board 779 (FIG. 8). Preferably, power driver 127 includes channel activation lights 775, for showing which of the four channels is activated and which are not. Channel activation lights 775 may also indicate what is happening on the trunk connected to the driver, such as whether a specific trunk is transmitting, receiving, or is hung up by appropriate signaling, such as by flickering at various rates. Power driver 127 includes a ground screw 776 for connecting the ground wires from the associated AC wiring, such as 128 (FIG. 3), wiring connections 777 for connecting the live wire connections from AC wiring 128, and a cutout 778 for feeding the associated low voltage control trunk 170 through the power driver. As shown in FIG. 9, the faceplate of double wall outlet box 179 is removed to facilitate attachment of power driver 127. In addition, double wall outlet box 179 includes an outrigger 180 on the bottom to attach and retain the associated low voltage control trunk 170. Power driver 127 preferably has a width approximately that of a double switchplate/wallplate and a height slightly taller than a double switchplate/wallplate. The electrical connections are preferably pig-tailed to wiring connections 777, so if you have to replace an electrical device, the wiring is snapped out and then snapped into a replacement device. The above system allows the building automation system to be easily installed. For example, a house may be wired with conventional wall boxes. At each wall box, a loop in the CAT5 cable low voltage control trunk 170 is clipped to the lower edge of the wall box. Then drivers and user interface units may later be installed as needed. Blank wall plates may be installed to support the addition of wired remote controls as needed. In the preferred embodiment, each driver 127 has four driver channels. The preferred driver includes a processor with embedded EEPROM, preferably a model PIC 16F873-201/SO sold by Microchip Technologies, Inc., 2355 West Chandler Boulevard, Chandler, Ariz., 85224 (hereinafter "Microchip"). As indicated above, drivers 202 can include drivers to control any electrical device in a building including indoor and outdoor lighting, fans, sprinklers, pool/spa heaters and pumps, electronic drapes, windoware units, fireplaces, garage doors, electronic door locks, hot water heaters, fire detection and monitoring equipment, electronic gates, digital security cameras, motion sensors, flood monitors, humidifiers, home theater units, phone PBX, voice mail, intercom, door phone, aquarium sensors and heaters, sidewalk and driveway heaters, and other peripheral systems and devices in a building.

Drivers also control HVAC units including furnaces, air conditioners, solar heating panels, and dampers for individual registers in an HVAC system. The damper system is one that is very useful because of its ability to zone control the entire house.

FIG. 10 is an illustration of a touchscreen user interface unit, such as 162. User interface unit 162 preferably includes a UL-rated molded plastic housing 251 with a molded color finish, and a touchscreen 188 with integrated monochrome or color LCD display 250 for displaying menus and images to a user. The menu shown in FIG. 10 is the default menu for controlling each device in the room. User interface unit 162 preferably includes a speaker 182 and a microphone 184 for communications between users and other audible signaling, an infrared (IR) sensor 183 for communicating with a wireless remote control 150 (FIGS. 3 and 13) or other IR devices, a room button 185, a motion detector 186, often referred to as an occupancy sensor, for detecting the motion of persons in a room, and a digital camera 187 for taking digital photographs of a room. Room button 185 is programmable and is preferably programmed to activate a key function that a user is most likely to activate when entering the room, such as turning on the main lighting in the room where user interface unit 162 is located. The button is pre-programmed by the user or installer to quickly enable a function to be activated without utilizing the menu displayed on touchscreen 188 of user interface unit 162. Preferably, room button 185 includes a light for lighting the button. Motion detector 186 preferably includes a two-zone motion detector that detects motion in at least one direction. Preferably, motion detector 186 detects motion in two directions by use of shutters on the sides of motion detector 186 that control or restrict that field of view. These shutters are adjustable to facilitate the detection of motion in an entire room. Digital camera 187 has streaming video capabilities to enable building automation system 120 to capture and transmit either still or moving video pictures from remote sites, which pictures can be sent, via communication lines, wireless or otherwise, to other persons or monitoring systems, such as security monitoring services or the police. Preferably, microphone 184 and speaker 182 of user interface unit 162 act as an intercom for room-to-room communication. As noted above, building automation system 120 includes an audio storage memory 116 (FIG. 2). The various sounds and messages noted above can be programmed to play throughout the building or house or in specific rooms through speakers 182 in user interface unit 162 or other remote speakers or audio system. For example, doorbells can be programmed to sound in any room, via speaker 182. User interface units 162 are of varying sizes that fit the needs of the particular room in which they are located. For example, in a large custom house, the master bedroom suite may have a large user interface unit with color LCD display to provide full functionality and clear menus and digital images to a user, while, on the other hand, a simple bedroom may have a smaller user interface unit with a monochrome LCD display. User interface unit 162 preferably includes a temperature sensor 252 that measures a room's temperature and passes this data to controller 122, so that controller 122 can adjust the HVAC system accordingly and adjust appropriate dampers for individualized climate control in each room.

User interface unit 162 is low voltage and, as discussed in connection with FIG. 4, is system powered via trunk line 170. It preferably includes a UL-rated circuit board that preferably incorporates a 16-bit, 16K microprocessor 1020, preferably with an embedded Flash memory 1022. In the preferred embodiment, it includes a PLCC-44 microprocessor with embedded EEPROM and a Microchip model PIC 18F452-I/L in the basic unit. An enhanced unit also includes a Toshiba model TC58FVB160AF chip with an embedded 1M×16 EEPROM Flash memory and a Toshiba model TH58100FT chip with a 128×8 NAND EEPROM 48-TS. A user interface may also include a TMS 320VC5502 digital signal processor. The electronics of each user interface unit 162 preferably also includes software, which is object based and table driven. This software is used to program and display the display 250. Housing 281 is preferably about 4.6 inches wide by 5.7 inches high and 0.75 inches thick.

Turning to display 250, for clarity, to differentiate between hardware devices 201, 202, 203 and devices that appear on the display of touchscreen units, buttons and other devices that are shown on the screen will be referred to herein as "screen objects". Display 250 shown in FIG. 10 includes the following screen objects: touch buttons for controlling the main light, the center light, the front light, and the rear light in the room, which in this example is bedroom 45 (FIG. 3); buttons for controlling music, for providing lighting appropriate for setting several scenes, including reading, moving about the room, and cleaning the room; plus a button to turn all lighting off. Scene control is a feature of the invention. Scenes can be lighting scenes including lights in a designated zone. Lighting zones can specify, for example, all wall mounted lighting fixtures, or all ceiling mounted lighting fixtures, or a single lamp, or can be a mixture including any lighting fixture; or a lighting zone may include lighting fixtures in several rooms or a room and adjoining hallway. Lighting zones can be any combination of lighting fixtures a user desires. Scenes can also include audio or any other controllable function in a building. For example, the read scene can include suitable lighting for reading in bed, soft music, a turned-off TV, and a turned-down temperature.

Display 250 also includes an additional pages button 253. This button permits the user to page through additional displays programmed for the room. That is, in large rooms there will be more buttons programmed than can be effectively displayed on one display; these can be reached through the additional pages button. Display 250 also displays the accurate time and room temperature at 254.

FIG. 11 illustrates one of the additional pages 1100 available by touching additional pages button 253. Preferably, this would be the last page, and touching additional pages button 253 on this page would return the user to first page 250. Page display 1100 includes buttons for controlling the fan, the air conditioning, and the heat in bedroom 45. A window 1102 shows the current status of temperature control, i.e., the air conditioning is on the low setting, and another window 1104 displays the room temperature. Page 1100 also includes a "rooms" button 1106, which, if touched, causes unit 162 to display a list 1200 of buttons for all the rooms in the building, an example of which display is shown in FIG. 12. Touching a button in rooms display 1200 causes unit 162 to display the current default display for the selected room. Every device in that room can then be controlled as just described for bedroom 45. For example, if kitchen button 1208 is touched, the default display for the kitchen comes up and every device controllable from the kitchen interface unit display can be accessed in the same manner on the distant unit as they can from the kitchen unit. Additional pages button 253 pages through additional displays that include rooms in the house not shown on display page 1200. In display 1200 and any of the other additional pages available in rooms mode, touching room key 1106 returns the unit to the default display of the room in which interface unit 162 is located, i.e., the default display of bedroom 45. Alternatively, a plan view of the building with each room shown can replace list 1200. In this alternative, the default display for the desired room is retrieved by touching the desired room on the plan view, and pressing additional pages button, remote control user interface unit 150 shows different floors of the building. Display page 1200 also includes a program or access button 1110 for accessing devices in other locations in the building. In the preferred embodiment, this button causes interface unit 162 to display a list 1305 (FIG. 15) of buttons showing all devices programmable by system 120, which list will be discussed in detail in connection with FIG. 15. Program button 254 may be called by other terminology; the important feature is that it allows the user to access devices in locations other than the present room. If touchscreen 188 is not touched for a programmable predetermined time, such as 30 seconds, the display returns to default display 250.

Figure 13:
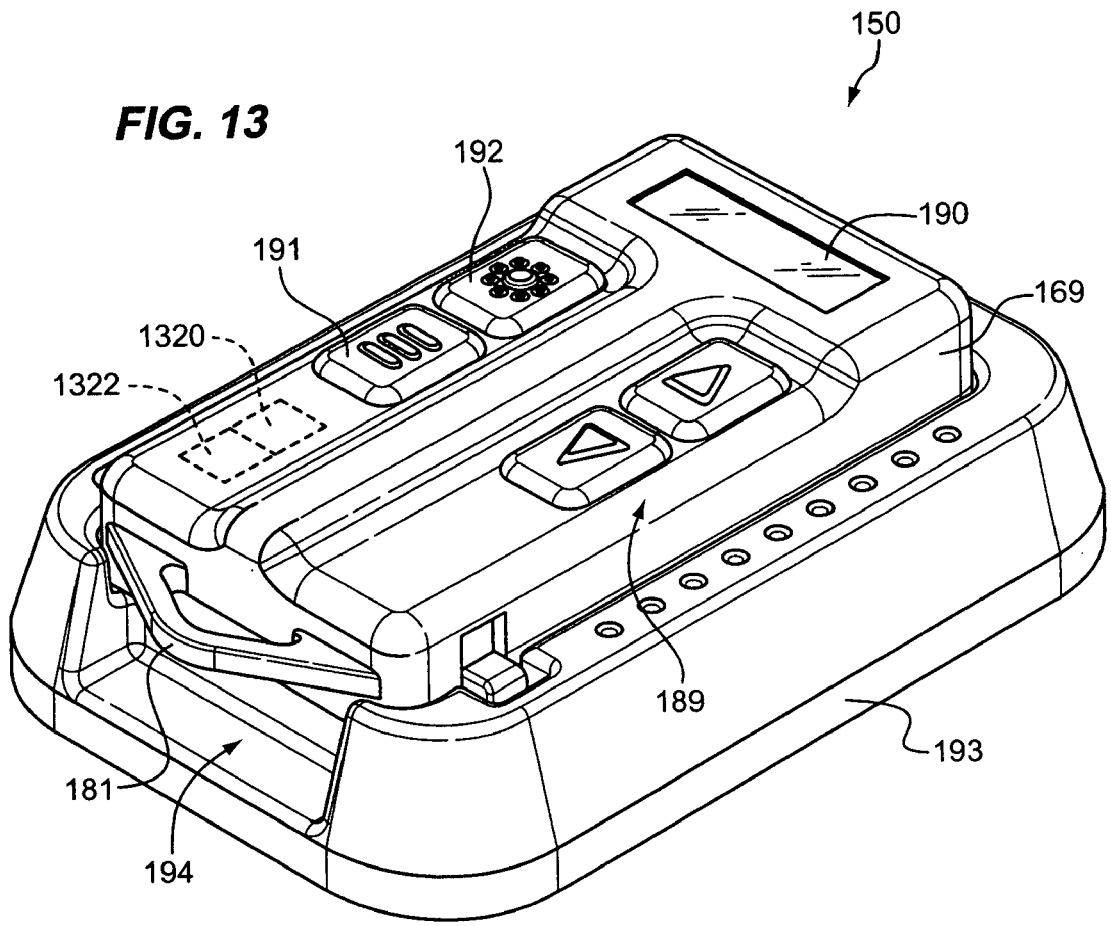
FIG. 13 is an illustration of a perspective view of a wireless remote control docked to a wireless remote charger according to the invention.
Figure 14:
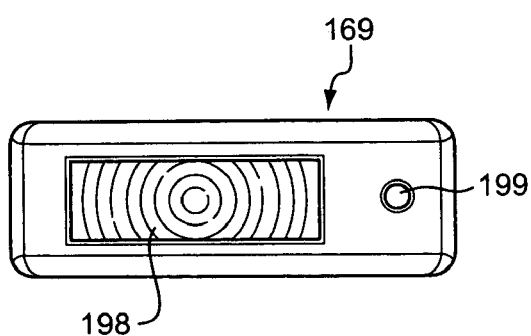
FIG. 14 is an end view of the wireless remote control of FIG. 13.

FIG. 13 is an illustration of wireless remote user interface unit 150 in a wireless remote charger 193, and FIG. 14 is an end view of unit 150. User interface unit 150 is a portable and compact wireless remote that preferably uses IR waves to communicate functions to IR sensor 183 of the user interface units, such as 162, connected to trunk lines 170, 159. It is preferably about the size of a key fob, i.e., no more than ten cubic centimeters in volume, and preferably five cubic centimeters or less. The preferred embodiment of remote housing 169 is about 1.25 inches by 2.5 inches by 0.5 inches. Wireless remote control 150 preferably includes up/down buttons 189, selector button 191, display 190, flashlight switch 192, flashlight 198 (FIG. 14), IR transmitter 199, and key fob hook 181. The electronics of remote 150 preferably include a rechargeable battery and a processor 1320 with embedded memory 1322. In the preferred embodiment, the processor is a PIC 16F873-201/SO microchip and a Cory quad driver. Charger 193 includes a notch 194 to provide clearance for hook 181, so that a user's keys, for example, can be attached to key fob hook 181 of wireless remote control 150 without interfering with the docking arrangement between wireless remote control 150 and wireless remote charger 193. Preferably, display 190 is a two-character display.

Up/down switch 189, selector switch 191, display 190, and the operating software of controller 122 and remote 150 operate together to permit the user to control any function in the room in which the remote is located. System 120 knows which room the remote is in by recognizing which wall interface unit, such as 162, is receiving its IR signal. Both remote 150 and controller 122 are programmed to control selected functions in each room. The function to be controlled is selected with selector switch 191. The remote indicates which function is being controlled using a two letter code, such as "LT" for light, "AU" for audio, "HT" for temperature, "AL" for alarms, "L1," "L2," or "L3" for supplemental lights, etc. By pressing selector 191, the user can cycle through the available functions. Up/down button 189 then controls the function shown in display 190. For example, if a user wanted to dim the lights in the room, the user would depress selector button 191 until "LT" is displayed on the two-character display, and then the user would depress the down arrow button of up/down buttons 189 to dim the lights in the room. The IR signals that remote 150 produces are the same for each room. For example, if the "LT" function is selected by selector 191 and up/down switch 189 is pushed up, the same IR signal, which we shall call the "LT Up" signal, is emitted by remote 150, no matter what the room in which it is located. Controller 122 is programmed to know what device(s) is or are to be controlled by the "LT Up" signal in each room. If, in this example, the remote is in family room 44 and system 120 is programmed to control recessed ceiling lighting 21 when the "LT" is selected by the remote, then when the "LT Up" signal is received by interface unit 152 and passed to controller 122 via trunk 170, controller 122 places the appropriate communication on trunk 170 to cause driver 143 to increase the power level to recessed lighting 21.

Wireless remote control user interface 150 allows a user to walk through a building and control the things only in the room the user is in without worrying about controlling other things in the building. So, for instance, if a user walks into a room and presses up/down buttons 189, wireless remote control 150 controls the lighting in that room, or whatever other function that the user has set up as the primary function of up/down buttons 189 in that room. It can provide complete access to every function of building automation system 120: it can allow a user to open their garage door; arm or disarm the security system; turn lights on, off or dim; or adjust audio levels and temperature as a user walks through a building. Preferably, wireless remote control 150 is waterproof and can be slipped into a user's pocket, fastened to a chain, or placed on their desk. While wireless remote control 150 is being charged by wireless remote charger 193, buttons 189, 191, and 192 on wireless remote control 150 are operable to a user.

Figure 15:
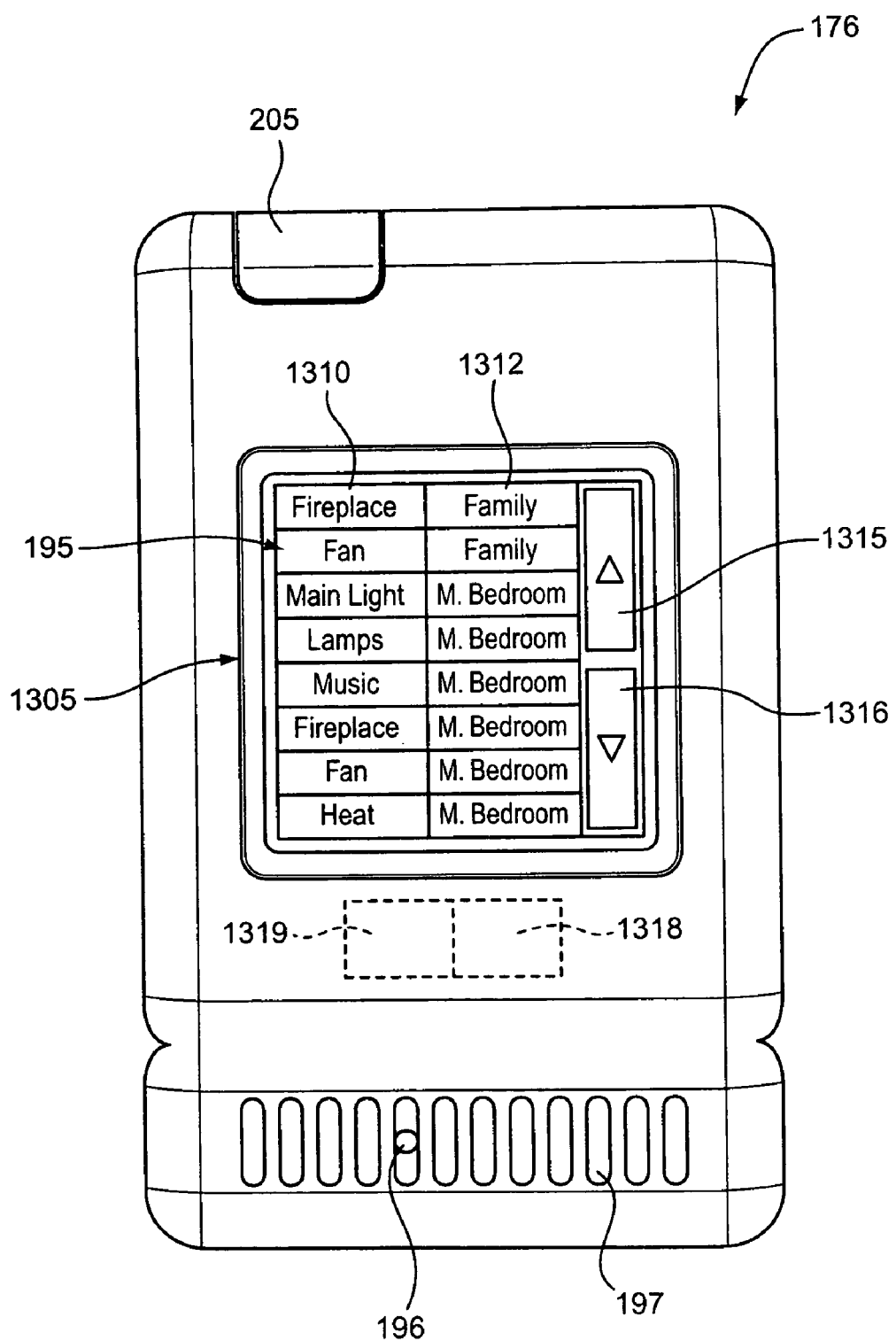
FIG. 15 is an illustration of a front view of a wireless remote control according to the invention.

FIG. 15 is an illustration of wireless remote control user interface 176 that preferably uses radio frequency (RF) transmitters to communicate with transceivers 177. Wireless remote control 176 preferably includes: a display 195 for displaying menus and images similar to the menus and images of user interface unit 162; and a microphone 196 and a speaker 197 for communicating between users throughout the building via automation system 120. The electronics of remote 176 are similar to the electronics of user interface 162, except that it also includes a transceiver 205 for communicating with transceiver 177. Like user interface 162, it includes a microprocessor 1318 with embedded memory 1319. In the display shown, a list 1305 of devices and rooms they are in appears when program button 254 (FIGS. 10 and 11) is touched. List 1305 includes a listing 1310 of all the devices that can be controlled by system 120 and an indication 1312 of the locations where the devices are located. List 1305 can be scrolled through by using scroll buttons 1315 and 1316. When the individual device is touched, the control attributes for that device are displayed. For example, if the main light in the master bedroom is touched, a display showing a light switch similar to the main light switch in display 250 of FIG. 10 is shown. In this manner, any device in the building can be controlled from any user interface unit 201.

Figure 16:
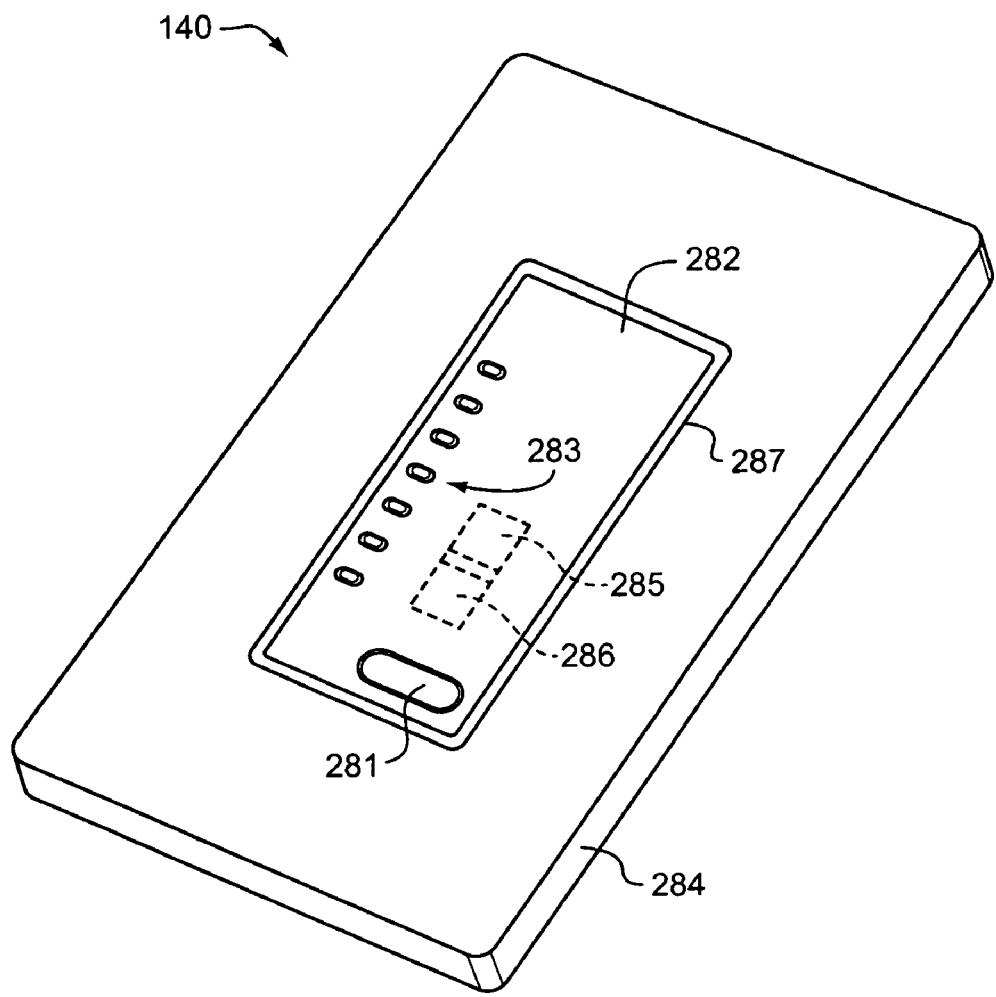
FIG. 16 is an illustration of a perspective view of a level control according to the invention.

FIG. 16 is an illustration of a level control 140, which typically controls a single function, such as lighting, fireplace, fan, sound, etc. Level control 140 preferably comprises a level control electronics housing 282 which fits into a cutout 287 in a wall plate 284 and includes an IR sensor 281 for receiving IR signals from a wireless remote control 150 and an energy level indicator 283 for displaying the energy level of the particular device controlled by level control 140. Energy level indicator 283 comprises a plurality of LEDs. At low energy levels, only the lower LEDs are lighted. The higher the level of LEDs 283 that are lighted, the higher the energy. Thus, the energy level is easily visible from across the room. The electronics of level control 140 include a microprocessor 285 and memory 286 which are located on a circuit board within level control housing 282. Preferably, the memory is embedded. The preferred processor is a Microchip model PIC 16F873-201/S with embedded EEPROM. Level control electronic housing 282 is preferably about two inches high and an inch wide by about 0.5 inches thick. Preferably, it fits within a single-gang box, and includes a molded ABS wall plate 284 that comes in a variety of colors. Level controls 140 are typically used in small spaces such as single-zoned bathrooms, utility closets, etc.

Level controls 140 preferably operate similar to a true rocker style level control operation and include full dimming capabilities. Level controls 140 have the familiar look of most architectural style level controls, but a number of extra features have been added. Preferably, level controls 140 are capable of creating lighting scenes and turning ceiling fans on simultaneously with one touch. Level controls 140 preferably are programmed to start lighting with a gradual rise to the selected brightness level, and gently fade the lighting fixtures when switched off. Level controls 140 "remember" the last light level used and will go directly to that level when switched on and off.

3. Programming

An important aspect of the building automation system according to the invention is the software and firmware programming stored in the memories discussed above. This software includes software and firmware controlling the internal functioning of user interface units 201 and drivers 202. For example, touchscreen interface units 132, 162, and 176 include software that creates the display on the units. This internal software is generally known in the art, and one skilled in the art can easily create such software or firmware based on the description of interface units 201, the displays in the interface units that utilize displays, and drivers 202 given herein. Thus, it will not be discussed in detail herein. However, the software that facilitates the communications between controller 122 and slave devices 201, 202 is novel and important to the invention. We will first present a brief overview of this programming, and then discuss it in detail.

Figure 20:
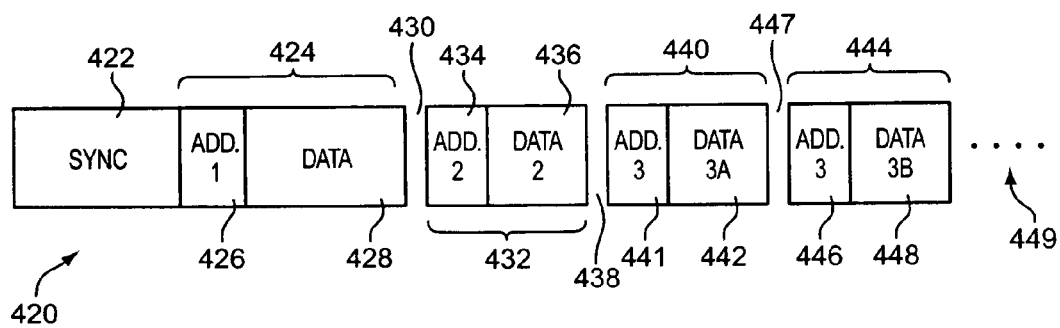
FIG. 20 is a block diagram illustrating the preferred communication sequence between the controller, the user interface units, and the controlled devices.

As indicated above, when system 120 is installed, every slave device 201, 202 is connected to a trunk. When the system is commissioned each slave device, including all user interfaces 201 and all drivers 202, including all add-on cards 117, is assigned an address. Communications between controller 122 and slave devices 201, 202 follow a novel protocol, the data packet 420 that is illustrated in FIG. 20. Periodically, preferably every 50 milliseconds (msec), controller 122 communicates a global synchronization signal 422. Global synchronization signal 422 includes an indication that a new message sequence is starting, time and date data, and may include other global data. Accurate time and date data is maintained within controller 122. Data may optionally be obtained from WWV receiver 118 (FIG. 2). Following the synchronization signal, data packets 424, 432, 440, 444, etc., are sent sequentially. Each data packet includes an address and a data block; i.e., data packets 424, 432, 440, 444 include addresses 426, 434, 441, and 446, and data blocks 428, 436, 442, and 448, respectively. Additional data packets are sent until all electronic elements in the system have been addressed, as indicated by dotted line 449. After each data packet is sent, controller 122 waits for a short period 430, 438, 447, etc., for the addressed electronic system element to respond. The response is also in packet form, including the controller address and data confirming that the addressed element is responding, and providing information requested by the controller. If a message sent by the controller or an electronic element is too long for a single data packet, it is broken up into as many data packets as are needed to complete the message. For example, when new software is uploaded from the controller to user interfaces 201 or drivers 202, many data packets are required.

Figure 21:
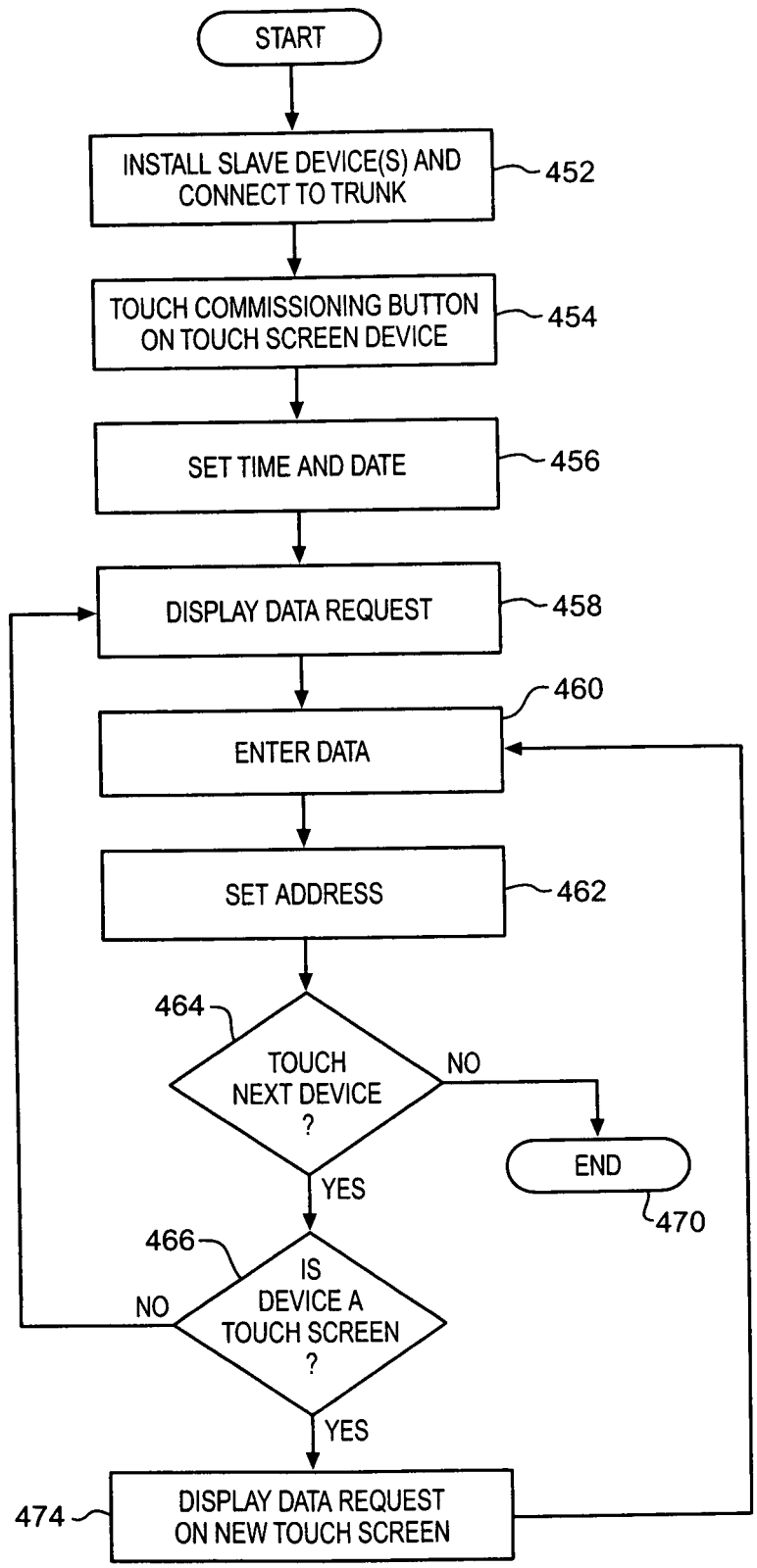
FIG. 21 is a flowchart of a method for installing a building automation system according to the invention.

Turning now to the details of the software and the programming of system 120, as indicated above, when a new system is first installed, the first part of the programming process is a task called "commissioning". The commissioning process is shown in FIG. 21. During this process, the various slave devices in the system will be identified and given names that identify their physical location within the system. For a controller to exchange information with specific slave devices, that slave device must have a unique "address" of some kind. As indicated above, this address is used as part of the message to the device to indicate that the data is intended for or requested from that device and that device only. As also indicated above, each slave 201, 202 and controller 122 contains an EEPROM memory device either as a discrete component or as part of a microprocessor chip. Several locations of the EEPROM memory are reserved for the "commissioning date" and several more are reserved for the "device address". These are left blank at the time of production. The slave devices are installed and connected to a trunk 170, 159 at 452. Initially, no slaves respond to any controller messages. At 454, the installer or user touches the commissioning "button" on a touch screen, which preferably is any part of the touchscreen. Each slave includes a "commissioning button". On touchscreens 132, 162, 176, pressing the quick-access button or the touchscreen serves this purpose. On level controls 140, pressing either position of the rocker serves. Drivers 202 and other devices without other buttons have a button specifically dedicated to commissioning. The first touchscreen touched becomes the default programming terminal for the system. It is first used in process 456 to set the time and date values of the master clock in the controller. The date so set becomes the commissioning date. The commissioning date is repeatedly broadcast to all slaves 201, 202 as part of the global sync message sequence 422 and the slaves store this date in local memory. Further, the pressing of the commissioning button sends a Requested Data Returned to the controller from the slave device. At 458, the controller sends a screen to the programming touchscreen that requests data for the device, including room and wall locations. The installer or user enters this data at 460, and commissioning of the device is initiated. In an address set process 462, the controller sends a Send Data mesage to address zero with the byte 2 parameter of the message set to 4. (see below). The data of this message is the "working address" to which the device will be set and referred to for all future communications. The device saves that address to EEPROM along with the commissioning date. The controller determines if the device is a touchscreen device at 464. If the device is not a touchscreen user interface, the controller sends the screen requesting data for the device to the programming touchscreen, the data is entered on that touchscreen, and the address is set at the device to be commissioned. If the device is a touchscreen, the data request is displayed on the new touchscreen device to be commissioned, and the address is set as before. The installer or user then touches the commissioning button of the next device at 464. This continues via processes 466 and 464 until no further commissioning button is pushed, and the commissioning process ends. In this manner, the controller assigns a unique working address to each device. Anytime a new device is added to the system and its commissioning button is pressed, the commissioning screen appears automatically. At this time, all the devices are given a new commissioning date.

The purpose of the commissioning date is to facilitate reuse of system devices. An installer may install a device in a system for a given customer. If that customer then desires an upgrade, the removed device becomes available for other uses in other systems. Since a device only responds in a system with the appropriate commissioning date, the previously programmed device will not cause an address conflict in the new system and will not be recognized until a renewed commissioning process changes the device's commissioning date.

Figure 17:
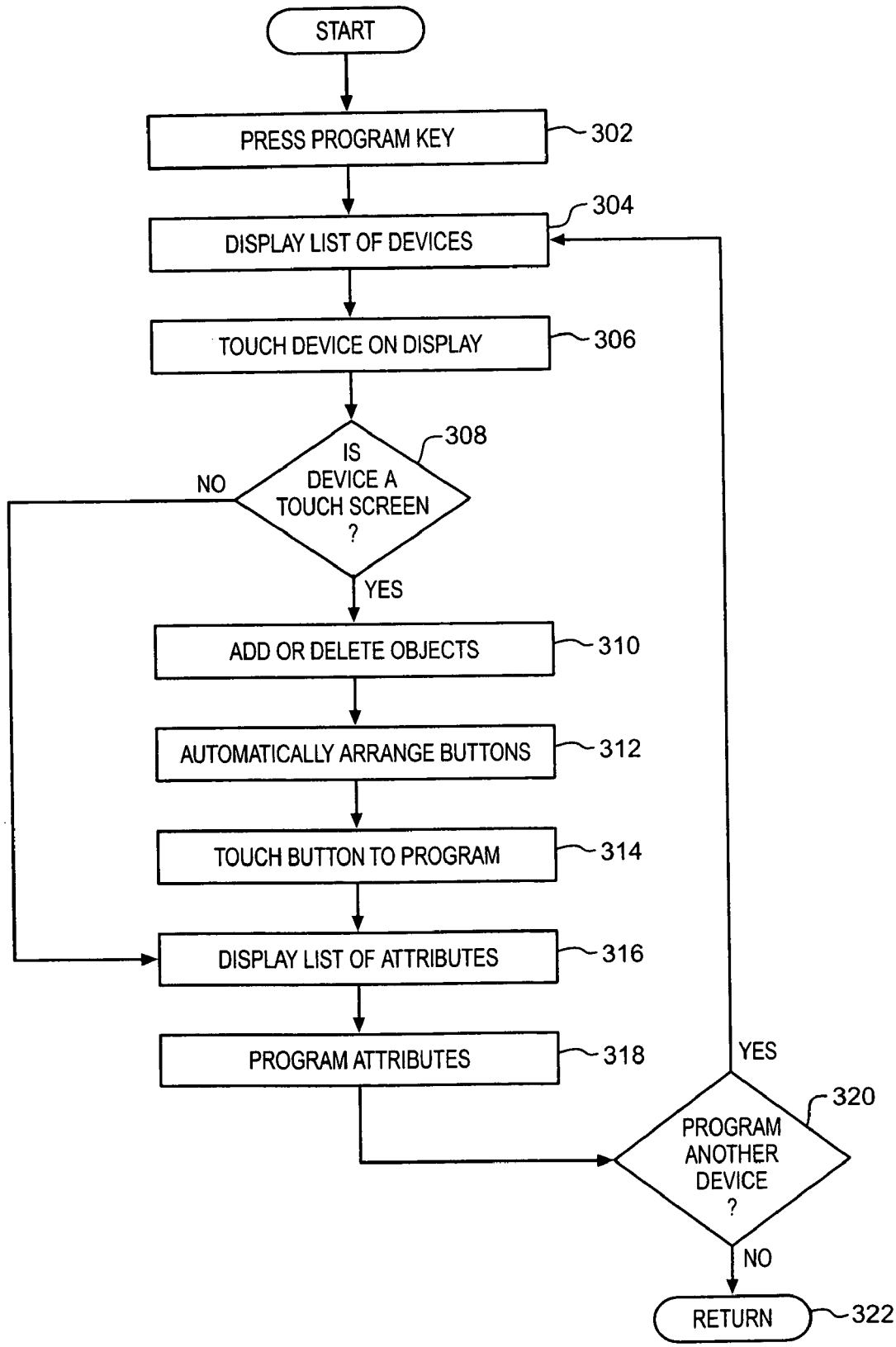
FIG. 17 is a flowchart of a method for controlling a selected electrical appliance in a room in a building according to the invention.

Once each slave device has been assigned an address, the system can be programmed. The commissioning process places a list of all devices and where they are located in controller 122. A programming button is also placed on each touchscreen. The programming process is shown in FIG. 17. First, program key 1110 of one of interface units 132, 162, 176 is touched 302. The controller sends a display list 195 (FIG. 15) to the interface unit, the program key of which was touched, and this list is displayed 304. The user touches 306 the device on the display that it is desired to program. Controller 120 determines if this is a touchscreen device at 308, and if it is, the user is then, at 310, allowed to add or delete screen objects to be programmed. This is done by displaying the available objects, such as level control switches or controlled devices, and using buttons at the bottom of the touchscreen to indicate whether the objects should be added or deleted. When the touchscreen is entirely programmed, the software automatically arranges 312 buttons for the devices and objects on the touchscreen. The buttons are automatically arranged in the order in which they were added, displaying each in the next available space from left to right and then from top to bottom. Buttons that need to be further programmed are touched at 314, and the system displays a list of attributes at 316. These attributes include what interface or interfaces 201 are intended to control which drivers 202, or conversely, which drivers are to respond to which interfaces, the default settings of level controls, the default settings of other electronics, minimum and maximum values, times at which functions may be turned on or off, etc. The list of attributes, while shown following the automatic arranging of buttons, can also be accessed prior to the arranging of buttons, and in fact at any time in the programming after commissioning provides a list of devices. Usually, programming is an iterative process in which objects and attributes are selected and programmed, rearranged, deleted, reselected, etc., until the screens are exactly as the user desires. The attributes are programmed at 318. If the device is not a touchscreen, the program proceeds immediately to displaying 316 the list of attributes. When the selected device is programmed, list 195 is again displayed, and the user can elect to program another device at 320, by touching 306 a device on the display, or exit from programming mode and return 322 to normal mode.

It is a feature of the invention that the commissioning and programming processes are interruptible and resumable—that the user may move between the processes as needed, working in the manner deemed the most comfortable.

An important part of the invention is the manner in which slave devices 201, 202 communicate with controller 122. As indicated above, in the preferred embodiment, building automation system 120 utilizes RS-422 transmission over 100 ohm terminated CAT5 cable in 8-bit asynchronous format at 250 or 500 kilo baud with CRC-16 error checking. Communication between the controller, the drivers, touchscreens, level control, and other devices is controlled and timed by the controller. The controller starts a communications round preferably every 50 msec. The start of a new round is signaled by the first of series of global messages, as described in detail below. In the preferred embodiment, there are no slave responses to global messages except during the commissioning process as described above. The first slave device is then sent a message and must return a response within a short time. This process proceeds until all of the devices have been serviced.

The messages exchanged between that controller and slave usually contain an update of control data. If data has not changed since the previous round, shorter messages are utilized that just check status. Examples of longer messages include screen changes for touchscreens, video images, and software updates. In some cases, time may not permit communications with all of the desired data transfer to complete in a single 50 msec interval, requiring data to be split into multiple messages sent over successive rounds. The most common example is that of software updates occurring while the system is already heavily loaded, for instance due to video image transfers.

The specific details of a message depend on the devices involved. However, the general format of a message is as described in the following protocol.

Messages originating at controller 122 include global messages 422 and data messages, such as 428. Global messages are messages sent by the controller to all devices in the system with no device sending a response, except for commissioning. The data sent in these messages is of interest to all or to a multitude of slave devices. In the preferred embodiment, global messages are synchronization messages, though other global messages are possible. Sync messages are used to signal the beginning of each communication round. They also provide global data that is needed by most slave devices. All sync messages utilize the following format:

byte 0—00sddddd where s is one for the starter byte and zero for the successive data bytes, and d is the data.

bytes 2,3—16-bit CRC.

One sync message is sent at the start of each communications round. A series of sync messages are sent in successive rounds in the following order (only byte 0 shown):

001sssss—lower 5 bits of seconds count
  000 mmmms—lower 4 bits of minutes count, upper bit of seconds count
  000000mm—upper 2 bits of minutes count
  000hhhhh—hours count
  000ddddd—day-of-month count
  0000mmmm—month count
  000yywww—lower 2 bits of year count, day-of-week count 000yyyyy—upper 5 bits of year count
  000ddddd—commissioning date, day-of-month
  0000mmmm—commissioning date, month
  000yywww—commissioning date, lower 2 bits of year, day-of-week
  000yyyyy—commissioning date, upper 5 bits of year Additional data may be added to this sequence to meet future requirements. Time is counted in seconds from midnight. Date is counted from 1-1-2000.

A group of the messages provides a complete time, date, and commissioning date update throughout the system, and devices that utilize this data keep a record in local memory that is updated each time the data is received. Slaves monitor the reception process so that if a data value does not arrive on time, the rest of the data is ignored until the next 001sssss message. All clocks in the system are synchronized within 600 milliseconds of the master.

A Detach message is sent if a device button is pushed before the controller is ready to commission it. This occurs if a device other than a touchscreen is pushed before a programming touchscreen has been assigned or if another touchscreen is touched before the system time and date have been set. The message is also used to drop the system out of commissioning mode after a timeout period has elapsed. The Detach message uses the following format:

byte 0—00111111 where s is one for the starter byte and zero for the successive data bytes, and d is the data.
  bytes 2,3—16-bit CRC Data messages include Device Status Interrogation messages, Send Main Variables messages, Send Data messages, and Request Data messages. Device Status Interrogation messages have the following format:

Bytes 0,1—10nnnnnn nnnnnnnn where n is the working address of the slave being interrogated.
  Bytes 2,3—16-bit CRC.

The Send Main Variable message is a space-saving way to send any combination of the first seven variables. This requires six bytes to send one variable value or eleven bytes to send seven variables. The Send Main Variable message has the following format:

Bytes 0,1—11nnnnnn nnnnnnnn where n is the working address of the slave being addressed.
  Byte 2—0vvvvvvv where a one in any of the positions 0–6 indicates that a value for the corresponding variable 0–6 will follow.
  Bytes 3 to end-2—variable value 0–6 as required
  Bytes end-1 and end—16-bit CRC.

The Send Data message sends up to 256 bytes of data. The destination for the data is specified in the instruction coding in byte 2. The format of the Send Data message is as follows:

Bytes 0,1—11nnnnnn nnnnnnnn where n is the working address of the slave being addressed.
  Byte 2—10000iii where iii represents the data destination as follows:
    0—variables (in pairs as variable number followed by value)
    1—attributes (full set as in template)
    2—screen page (touchscreens & remotes)
    3—reserved
    4—address data (used in commissioning process)
    5—code update
    6—more data, append to previous
    7—more data, final record
  Byte 3—count of data bytes to follow
  Bytes 4 to end-2—data
  Bytes end-1 and end—16-bit CRC.

The Request Data message is sent by the controller and causes a block of data to be sent by the slave. Its format is as follows:

Bytes 0,1—11nnnnnn nnnnnnnn where n is the working address of the slave being addressed.
  Byte 2—11000iii where iii represents the source of the data as follows:
    0—variables
    1—reserved
    2—reserved
    3—reserved
    4—information block
    5—reserved
    6—reserved
    7—device data—returns data that describes the device type, manufacturer name, manufacturing rev, embedded firmware copyright notice, and other device specific data.
  Bytes 3 and 4—16-bit CRC.

Messages are also sent by slave devices 201 and 202. Slaves only respond to messages which contain their specific working address and commissioning date. The only two exceptions to this rule have been explained above in the section describing the commissioning process. In the preferred embodiment, there are four types of slave messages: Status Returned; Main Variables Changed; Request for Screen, Program or Scene Data; and Changed Variables or Requested Data Returned. The Status Returned message only is used for returning device status. Its format is as follows:

Bytes 0,1—01nnnnnn nnnnnnnn where n is the working address of the slave responding.
  Byte 2—10ssssss where s is the status of the device, and is device dependent. Some status codes are standardized:
    0—All OK
    1—screen refresh (touchscreens)
    2—screen page change (touchscreens)
  Bytes 3 and 4—16-bit CRC.

The Main Variables Changed message returns the changed values for up to seven variables. It has the following format:

Bytes 0,1—01nnnnnn nnnnnnnn where n is the working address of the slave responding.
  Byte 2—0vvvvvvv where a one in any of the positions 0–6 indicates that a value for the corresponding variable 0–6 will follow.
  Bytes 3 to end-2—variable value 0–6 as required
  Bytes end-1 and end—16-bit CRC.

The Request for Screen, Program or Scene Data message requests the data from the controller. It has the following format:

Bytes 0,1—01nnnnnn nnnnnnnn where n is the working address of the slave responding.
  Byte 2—1100iiii where iiii is the data type 01—Scene edit screen data
10—Program screen, device selection
11—Program screen, touch device selection
12—Program screen, attribute selection
13—Program screen, touch attribute selection
14—Program screen, device controlled or controlling selection
Byte 3—selection code for program screen or scene code
Bytes 4 and 5—16-bit CRC.

The Changed Variables or Requested Data Returned message returns the data previously requested. It has the following format:
Bytes 0,1—01nnnnnn nnnnnnnn where n is the working address of the slave responding.
Byte 2—11100iii where iii is the data type
  0—variables (in pairs as variable number followed by value)
  1—Attribute change, new value
    Byte 4—Attribute code
    Bytes 5-n—New value, length varies according to attribute
  7—Device Data—returns data that describes the device type, manufacturer name, manufacturing rev, embedded firmware copyright notice, and other device specific data.
Byte 3—count of data bytes to follow
Bytes 4 to end-2—data
Bytes end-1 and end—16-bit CRC.

As discussed above, if the device has not yet been commissioned and it's commissioning button has been pressed, the Requested Data Returned is sent where the byte 2 parameter is 3 and the data sent corresponds to the device type.

The messages sent by slave devices 201, 202 preferably also include a manufacturer's, licensee's, installer's, or other protective code. This code is preferably inserted into memory 1022, 1322, 1319, 286 of the slave devices at manufacture, during installation, or at some other time, and included in the Requested Data Returned message, but may also be included in any of the other messages, or contained within a separate message used during the commissioning process. For example, it may be sent with the first signal sent by device 201, 202 when the commissioning button is pressed. In the preferred embodiment, the Device Data bytes in the messages described in detail above contain this code.

The fundamental purpose of this code is to protect the integrity of system 120. System 120 according to the invention is a sophisticated system in which all electronic elements 122, 201, 202, and 203 depend on the other elements for the system to operate properly. Since a key aspect of the invention is that all electronic elements are connected to a common trunk, or just a few trunks, all of which connect to controller 122, a single defective or otherwise malfunctioning electronic element could paralyze a portion of the system. Further, it is recognized that once the system becomes commercially successful, others will be able to make cheap knock-offs of the electronic units, such as a level control 140 or other user interface 201 or driver 202. Generally, as known in the art, such knock-offs may be of inferior quality or contain software incompatibilities. For example, a knock-off may not utilize an UL-approved circuit board. Such an inferior board could cause a fire hazard or other problem.

On the other hand, manufacturers, distributors, and installers that agree to abide by strict manufacturing and installation specifications may be licensed by the owner of the technology of the invention. These licensed manufacturers, distributors, and installers will be able to be policed by the owner of the technology, thus ensuring a degree of quality that will not cause problems within system 120. Thus, these licensed manufacturers, distributors, and installers are assigned protective codes which identify them.

As indicated above, the protective codes are preferably included by a user interface 201 and device driver 202 (FIG. 2) in the Requested Data Returned message during the commissioning process. Controller 122 uses this code to indicate what licensed manufacturer or distributor made each device in the system, and to provide a file of manufacturers and licensees the devices of which are included in the system. If manufacturer or distributor is not the owner of the technology or a licensee, the controller will not recognize nor communicate with the device and it will not operate within the system. An alarm or other indication that a non-qualified device has been connected to a trunk may also be output.

The protective system also is useful in policing licensees. For example, it permits the installer, user, and technology owner to determine if a particular licensee is manufacturing inferior equipment or if an installer is making defective installations. It also prevents imitators from selling devices to be placed on the system, while allowing licensees to do so. In the preferred embodiment, the protection method has three parts: 1) All firmware and software is to be copyrighted and an embedded copyright notice is placed in all code; the notice is in ASCII format near the beginning of the object file. For example, the notice can read "Copyright 2003, LifeSpace Inc., Broomfield Colo. USA". 2) The copyright notice is followed by two bytes that are reserved for a manufacturers code. Thus, a licensee uses a common code with the code creator's copyright notice in it, but the two bytes following the notice would be different for licensees. 3) During commissioning, the controller 122 will cause the copyright notice embedded in the device to be transmitted as part of a message. If it is not the appropriate copyright notice, the device is not given a working address, and will thus not operate in the system.

Controller 122 performs three key tasks: editing a program file, moving program data from controller 122 to user interface units 201, and interpreting the data returned by the target device. The task of editing a program file occurs through the cooperation of controller 122 and the touchscreen user interface units, such as 162. Preferably, screen editors are a part of the touchscreen user interface unit such as 162, and they allow program items to be selected, added, modified, and deleted. The user program resides as a file within controller memory 245. During the editing process, controller 122 must send appropriate segments of this file formatted for touchscreen 188 of the user interface units. Once a user program is edited in the controller's program file, it must be continuously interpreted to control the devices in the system.

A feature of the invention is that building automation system 120 passes data instead of passing commands. For example, if a user wants level control 140 to lower the lighting of control lighting fixture 142, the user contacts level control 140 to change the lighting level of lighting fixture 142. This contact changes a data variable in level control 140 and, as discussed above, controller 122 periodically queries level control 140 as to whether it has any changed data. Controller 122 changes the old data for the particular variable in the program to the new data and responds by sending a data signal to power driver 127 during the periodic data packet exchange to power driver 127 to change the power output to lighting fixture 142, which then changes the lighting output of lighting fixture 142. In another example, lighting fixture 142 may include both a lighting level variable and a dimming rate variable, which can be changed by a user. This information is again transferred to controller 122 that controls power driver 127 and lowers or raises the electrical output to lighting fixture 142 by the user desired rate and level.

Another feature of the invention is that all control information is retained in one place, the program data file in controller 122. Level control 140, power drivers 202, and user interface units 201 preferably also store locally the levels that they are set at so that, in case of a building automation system 120 fault, the electrical devices will remain at their previously set value. Alternatively, several different values can be stored at the user interface units, such as the level it is set to and another level in case of system fault. Screens are saved in controller 122, but also may be saved in the memory, such as 1022, of the user interface unit on which they are displayed. For example, the default screen is generally saved in the user interface unit memory as well as the controller. To make bringing up screens fast and easy, screens are saved under a screen file designation system, such as forms_rooms for the rooms selection screen. This designation is used by the programming to select a file to draw the screen.

Figure 18:
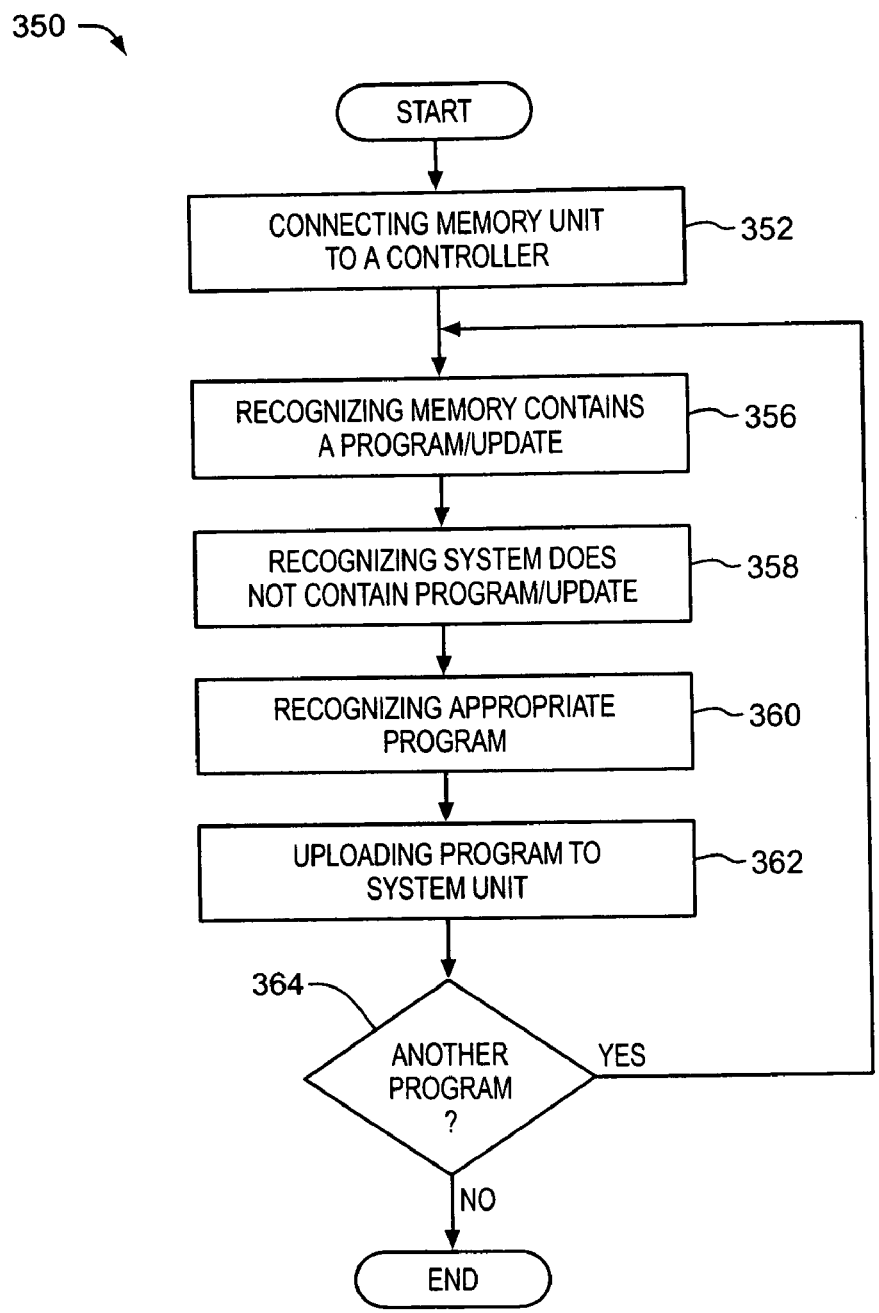
FIG. 18 is a flowchart of a method for programming a building automation system comprising a plurality of user interface units according to the invention.
Figure 19:
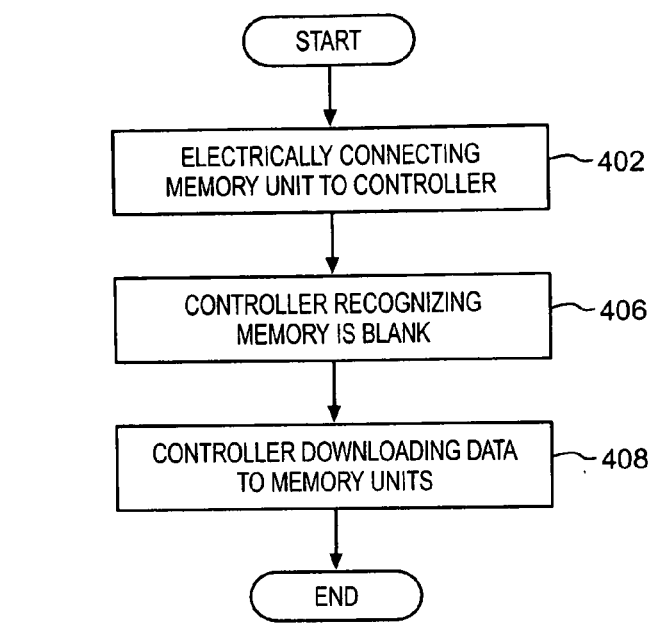
FIG. 19 is a flowchart of a method for backing up a building automation system comprising a plurality of programmable user interface units according to the invention.

The controller firmware also includes a novel process 350 for copying a program, updating firmware for all devices, or backing up system 120. The process 350 for copying a program or updating system firmware is shown in FIG. 18, and the process 400 for backing up the system is shown in FIG. 19. First, at 352 and 402, a memory is connected to controller 122, preferably by inserting a MMC card 533 (FIG. 5) into memory connector 244. If the memory contains a firmware update, the controller recognizes this at 356 (FIG. 18). Controller 120 then queries itself and each slave device 201, 202 in the system and recognizes at 358 that the system does not contain a level of firmware equal to or later than that of the MMC card 533. It then checks 360 if the firmware in memory 533 is appropriate for the system. If these conditions are met, the firmware is uploaded to the appropriate memories in system 120. The program via process 364 checks each device in the entire system 120, and for each device performs the firmware update process for that device as appropriate.

If the memory is blank, at 406 (FIG. 19), controller 122 recognizes that the memory is blank. The controller then downloads 408 or copies the data of the program data file from controller 122 to the memory, which is preferably an MMC card 533. Memory 533 can then be used to automatically upload the program to an identical system via the process of FIG. 18. This is a highly useful and expense-saving process when installing the system in a plurality of similarly constructed buildings, such as an apartment complex. If there are small differences in the installation in such a situation, the system can be uploaded automatically to the parts that are the same, and then the non-identical parts can be separately installed and programmed.

Figure 22A:
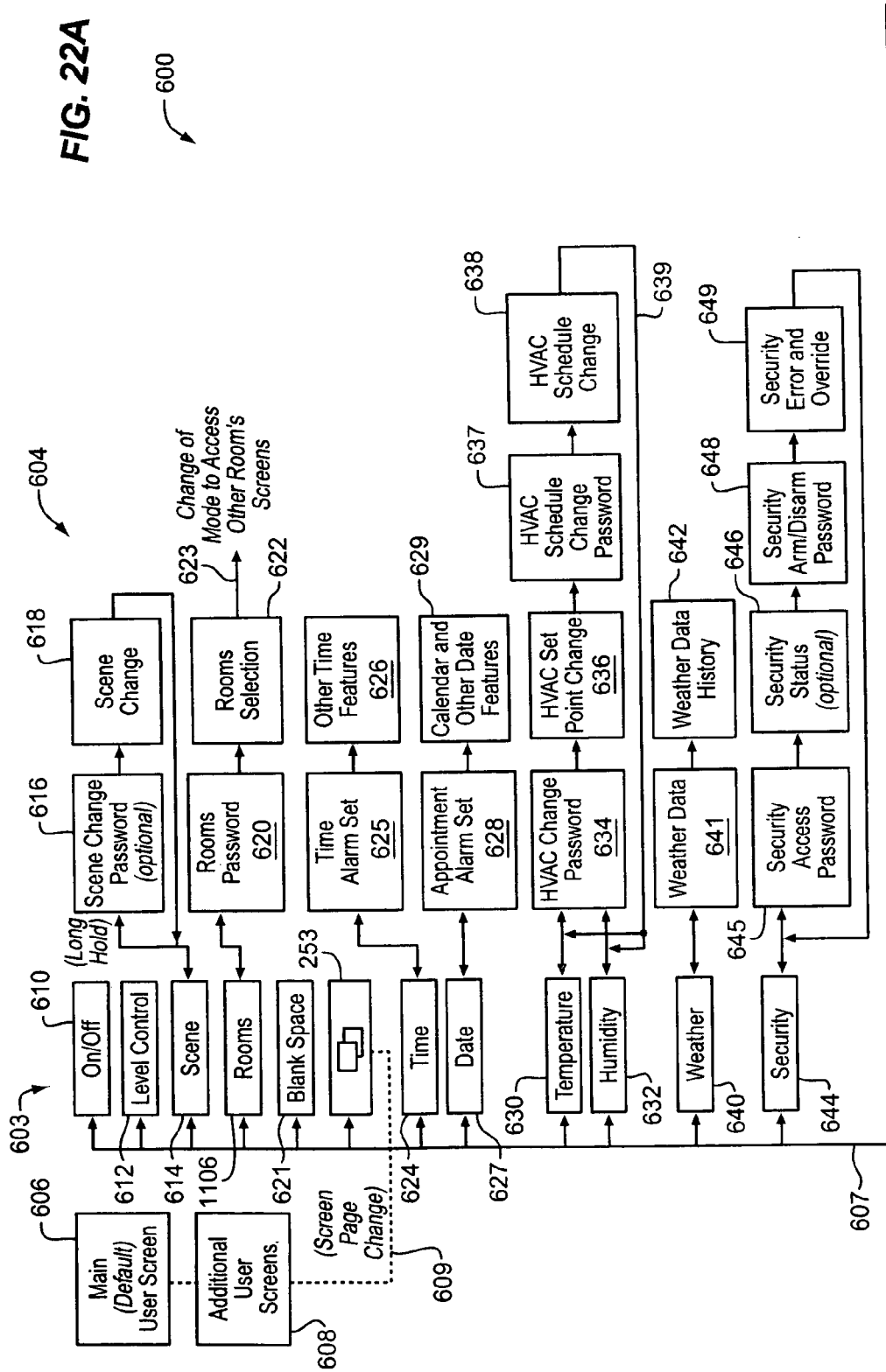
FIGS. 22A and 22B is a flow chart illustrating the various types of display screens available in the preferred embodiment and their functional relationship.
Figure 22B:
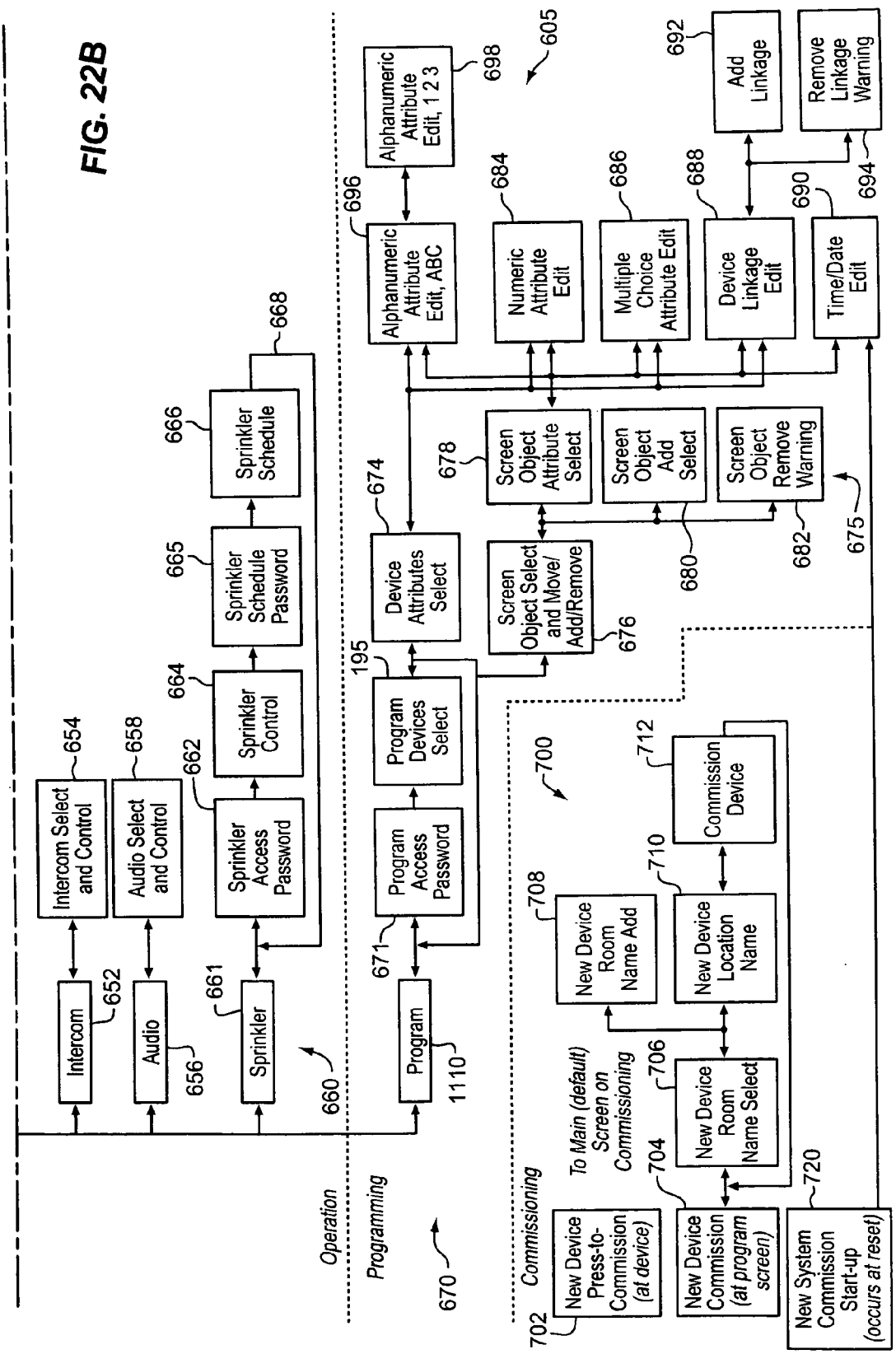

Building automation system 120 according to the invention makes extensive use of LCD interface units 132, 162, 176 with touchscreens as the main means of user control. Part of the design philosophy of the system entails minimizing the number of levels of screens that a user must navigate to perform common functions. A key to accomplishing this is that most often used functions appear on the main screens. For example, the main screen of a touchscreen control unit might show buttons for dimming a light, setting some lighting scenes, switching a fan on and off and adjusting it's speed, and viewing the time, temperature, and date. Each of these functions is available with a single button push, and no other screens are needed to accomplish the function. FIGS. 22A and 22B is a flow chart 600 illustrating many of the various types of display screens and screen objects available in the preferred embodiment and their functional relationship. These two figures should be viewed by connecting them along the dashed line at the bottom of FIG. 22A and the top of FIG. 22B to show the complete flow chart 600. The system includes a top layer 604 of programmable operation screens and keys on the top side of the figures, plus fixed underlying layers 605 of programming screens 67Q and commissioning screens 700 on the bottom. Generally, top level screens 604 are readily programmable by the user, which generally, at least initially, will be the installer, while, generally, lower level screens 605 are pre-programmed by the manufacturer. Operation screens 604 include user screens 606 and 608 made up of user programmable screen objects 603. That is, the screens 606 and 608 are made up of screens and objects such as those just to the right of line 607. The programming system allows the user to select the screen objects the user would like to have ready access to and to arrange them on programmable screens 606, 608 as the user sees fit. These programmed screen objects will be displayed on a main user screen 606 in the order determined by the programmer. If the selection exceeds the display room of a single screen, an additional pages button 253 is automatically added to the first screen, and an additional screen 608 is started. As many additional screens as needed are added.

User programmable screen objects 603 include on/off objects 610, level control objects 612, scene objects 614, ROOMS objects 1106, blank spaces 621, additional pages objects 253, and special function objects 660, which include a TIME object 624, DATE object 627, TEMPERATURE object 630, HUMIDITY object 632, WEATHER object 640, SECURITY object 644, INTERCOM object 652, AUDIO object 656, and SPRINKLER object 661. The invention contemplates that many other user programmable screen objects 603 will be devised as building automation systems 120 according to the invention are developed.

On/off objects are used to control devices 203, which can either be on or off. Level control screen objects 612 are used to control devices that have desirable settings between on and off, such as the brightness of lamps or the speed of motors, such as in ceiling fans or fireplace blowers. As shown in FIGS. 10 and 11, level control screen objects such as the MAIN LIGHT button, the CENTER light button, the FRONT light button, and the REAR light button in FIG. 10 and the FAN, AIR, and HEAT buttons in FIG. 11 have arrow buttons for up 256 and down 257, a space 258 for the name of the function controlled, and a bar-graph 255 indicating the power level currently programmed. In FIG. 10, bar graph 255 for the MAIN LIGHT shows that the main lighting is at a full power level while the bar graph for the CENTER light shows that that the light is at about the half power level.

Scene buttons screen objects 614 allow a combination of devices to be set at the same time, each to a different value. Optionally, a SCENE CHANGE PASSWORD screen 616 may be programmed between SCENE button 614 and SCENE CHANGE screen 618. The number of devices controlled is selectable. In the simplest case, a scene button screen objects may control only one setting of a single device, such as a button that, when pressed, turns a fireplace alternately on and off, or a button that sets one level to a lamp. A complex example is a button that might be labeled "FIRESIDE" which dims the main room lights, turns on mood lights over art objects, turns on the fireplace, and switches on the whole-house audio system to soft classical music. Scene button screen objects may be linked in groups that control the same devices but have independent levels, such as a set of lighting buttons labeled as "DINNER", "CLEAN", "CARDS", AND "OFF". In such a case, the DINNER button sets the lighting and music in the room, which is a dining room, at a relatively low level for eating, the CLEAN button sets the lighting at a full-on level and the music at an intermediate level for clean-up after eating, the CARDS button that sets the lighting at an intermediate level and the music at a low level for games, such as cards, and the OFF button turns the lighting and music off. Display 250 in FIG. 10 shows MUSIC, READ, MOVE, CLEAN, and ALL OFF scene buttons.

As discussed above in connection with FIG. 11, touching ROOMS screen object button 1106 provides a ROOMS SELECTION screen 622 which includes a button for each room in the building, or a series of screens, one for each floor of the building. Touching a button on screen 622 on which the name of a specific room appears operates a change of mode function 623, which brings up the main screen for that room, just as if the operator was in that room. From then on, the touchscreen operates just as the screen in the distant room. In these screens, a RETURN screen object button is added which, when pressed, causes the user to return back to normal operation. An example use of this feature is a parent who wishes to find out if a child's light has been turned out. The parent can even turn the light out himself. For each touchscreen, the rooms which may be accessed from that screen are programmable. Optionally, a ROOMS PASSWORD screen 620 may be programmed between ROOMS button 1106 and ROOMS SELECTION screen 622. A BLANK SPACE screen object 621 places a blank space in an area of the user screen. This function is used when there are not enough screen objects on a user screen to fill up the screen. By inserting blanks, the other screen objects can be spread out over the screen.

As discussed in connection with FIG. 17, after programming, upper level buttons 604 are automatically arranged into a series of user screens 606, 608, etc., in the order they were selected. As indicated by dotted line 609, these user screens may be sequentially accessed by touching ADDITONAL PAGES screen object button 253. This function has been discussed in detail above in connection with FIG. 10.

Special function screen objects 660 correspond to usually pre-programmed subsystems of the system. The invention contemplates that other subsystems other than those shown also will be designed and used. When a special function screen object button 660 is pushed, a screen appears that is dedicated to that function. For simple functions, only a single screen is needed. Complex functions, such as the security subsystem, may utilize several screens. It should be noted that, as shown in FIG. 10, some special function screen objects 254, such as time, temperature, and date, are not displayed in a "button" format, but simply display information, such as the time, which if touched, acts like button or key.

Building automation system 120 keeps track of time and date to a very high degree of accuracy, even through power failures, and distributes this time to all devices in the system. If TIME screen object 624 is programmed on a touchscreen, the current time is displayed in hours, minutes, and seconds. The format may be selected as AM/PM or military time. Touching TIME screen object 624 brings up a TIME ALARM SET screen 625 that allows the setting of alarms. A button on screen 625 brings up additional time features, such as displays of the current time in several time zones. The alarms and selection of the time zones are programmable by the user, but the time in each of the selected zones is automatically provided by controller 122, and the accuracy of that time may be further enhanced by the use of an optional WWV receiver 118 (FIG. 2). Touching DATE screen object button 627 brings up an APPOINTMENT ALARM SET screen 628 that permits setting of appointment alarms. A button on screen 628 leads to CALENDAR screen 629, which provides a calendar and other date features. Again, the appointments are preferably user programmable, while the calendar is provided as a software function preferably provided by third parties.

TEMPERATURE screen object 630 and HUMIDITY screen object 632 show the current temperature and humidity. Touching either TEMPERATURE screen object 630 or HUMIDITY screen object 632 lead to a series of HVAC screens 634, 636, 637, and 638. HVAC SET POINT screen 636 permits the setting of temperature, humidity, and other HVAC functions. Touching a HVAC SCHEDULE change button on screen 636 brings up a HVAC SCHEDULE CHANGE screen 638 that permits changing the HVAC schedules. Optionally, password screen 634 can be inserted between screens 630, 632 and screen 636, and/or password screen 637 can be inserted between screens 636 and 638. Screens 636 and 638 are iterative along path 639 until all HVAC settings are as desired.

Touching WEATHER screen object button 640 brings up a screen 641 that either provides weather data from local sources, provides weather information from third party service providers, such as Internet sites, or both. Several manufacturers produce suites of weather sensors for home or office building installation. Building automation system 120 can provide an optional port for interface to these systems. When the WEATHER button is pushed, a screen appears that indicates the current readings of the weather sensors. Using a HISTORY button on screen 641 brings up an additional screen 642 that displays the recent history of each of these weather parameters.

Conventional security sensors are scanned by system 120 using an optional security scanner module, preferably one of the add-on cards 117 in cabinet 172. As is known in the art, these include contact/closure sensors for the windows and doors of a house or building and motion detectors for detecting motion by an object within or outside of a building. All of these can be wired to the security scanner module. In addition, as indicated above, motion detectors and cameras are options that may be installed in user interfaces 201. The fact that a powerful processor and memory are included in each user interface unit and add-on card 117 permits sophisticated sound detection firmware to be included for detection of sounds such as breaking glass, a baby crying, an automobile in the driveway, chain saws, cries for help, and voice recognition software that can respond to an alarm at the sound of specific voices. Thus, system 120 can provide complete surveillance capabilities that include baby monitoring, visitor identification at entry doors, and whole-house supervision. Built-in motion detector 186 may be programmed to activate lights, digital camera 187, and alarms when an intruder is present. Furthermore, building automation system 120 can activate door locks in the building upon detection of an intruder as well. The system may be programmed so that motion detector 186 may initiate turning on lights when a person enters a room, and then gradually turn off when the person leaves. The security systems are preferably connected to a security system monitoring company or the police via a telecom interface function discussed below. When SECURITY screen object button 644 is pressed on a touchscreen, a SECURITY STATUS screen 646 appears showing the status of each zone of the security subsystem and whether or not the system is armed. This screen also has a PANIC button, which may be pressed to initiate an alarm manually. The security screens are preferably designed and programmed by a person experienced in the security area. Pressing one of the buttons on screen 646 brings up a lower level SECURITY PASSWORD screen 648 that requires the entry of a password, which leads to a SECURITY ERROR AND OVERRIDE screen 649 that permits the overriding of alarms. Optionally, a SECURITY ACCESS PASSWORD screen 645 may be inserted between screens 644 and 646.

Touching INTERCOM screen object button brings up a screen 654 or series of screens that permit voice communication with other rooms in the building.

Touching AUDIO screen object button 656 brings up a series of screens 658 that permit the control of source, channel, volume, and other features in a whole house stereo system. A feature of the invention is that control trunks 170, 159 can be used to move audio data as well as programming data. An audio module can be placed in control cabinet 172 that will provide the whole house with multiple channels of digital stereo audio. Alternatively, audio or video data may be piped throughout a building on wiring separate from system 120. In this case also, the audio/video system functions are preferably controlled by a module that is located within module bays 173 of control cabinet 172.

By addition of an optional sprinkler control module, usually in cabinet 172, system 120 is able to control lawn sprinklers, water features, and other similar systems. Like other subsystems, this has the advantage that the sprinklers may be controlled from any room in the house. Pressing SPRINKLER screen object button 661 brings up a SPRINKLER CONTROL screen, which shows the status of these systems and permits testing and other manual control. Further screens 666 allow the schedule of events of these devices to be programmed. If the weather subsystem is also installed, sprinkling may be controlled according to the measured rainfall, and features may be disabled while rain is occurring. The sprinkler system is preferably linked to the main time reference, so no resetting is needed for daylight savings time transitions. An optional SPRINKLER ACCESS PASSWORD screen 662 may be inserted between object 661 and screen 664, and an optional SPRINKLER SCHEDULE PASSWORD screen 665 may be inserted between screens 664 and 666. The sprinkler programming is iterative along path 668 until all sprinkler functions are set.

As also discussed above in connection with FIGS. 11 and 15, PROGRAM screen object button 1110 brings up a PROGRAM DEVICES SELECT screen 195 (FIG. 15) which lists all the programmable devices in system 120 and shows the room in which each device is located. Underlying list screen 195 is a group of screens 675, which permit the programming of the screens for each interface unit 202 in the building. PROGRAM button 1110 may optionally require entry of a security code at screen 671 to permit programming access. If the device selected to be programmed is a touchscreen user interface unit, screen 195 permits one to go to either a DEVICE ATTRIBUTE SELECT screen 674 or a SCREEN OBJECT SELECT screen 676. If the device is not a touchscreen user interface unit, the only choice is the DEVICE ATTRIBUTE SELECT screen 674, which is displayed on the default programming screen. When first programming a touchscreen, it is necessary to go to SCREEN OBJECT SELECT screen 676. This screen permits one to select and add, move, or remove screen objects. Screen objects are first selected via SCREEN OBJECT ADD SELECT screen 680, from a list of available objects. The selected objects are then given attributes via SCREEN OBJECT ATTRIBUTE SELECT screen 678. Examples of attributes that may be selected for a screen object are room name, label, such as "west wall", minimum value, maximum value, fade time, auto-on time, auto-off time, lighting curve, and linked devices. "Fade time" is a term for how long it takes a level control to go from the maximum to minimum setting and vice-versa. The lighting curve describes the correspondence between the setting of a level control and the power supplied. The linked device attribute describes how many devices are to be linked to a screen object. If the attribute entry is something that requires alphanumeric entries, such as the room name, the system goes to ALPHANUMERIC ATTRIBUTE EDIT ABC screen 696, which allows entry of letters of the alphabet. The programmer can switch between screen 696 and an ALPHANUMERIC ATTRIBUTE EDIT 123 screen 698, which permits the entry of numbers. If the attribute entry is one that requires only numbers, such as a maximum value, the system goes to NUMERIC ATTRIBUTE EDIT screen 684. If the attribute requires a choice of several alternatives, the system goes to MULTIPLE CHOICE ATTRIBUTE EDIT screen 686. If an attribute is a device linkage, the system goes to a DEVICE LINKAGE EDIT screen 688 from which a linkage can be added at 692 or deleted at 694. If the attribute requires time/date information, the system goes to a TIME/DATE EDIT screen 690. Once a screen object is selected, it can be removed via a SCREEN OBJECT DELETE button, which brings up a SCREEN OBJECT REMOVE WARNING screen 682, which allows the programmer to delete the object. Screen objects selected are listed on SCREEN OBJECT SELECT screen 676. A scroll button on this screen allows the programmer to select a screen object. Screen objects can be moved simply by selecting them on screen 676 and moving them to another line of the listing. If the device to be programmed is not a touchscreen, or if it is desired only to program the attributes of the touchscreen or screen objects associated with the touchscreen, the program proceeds to DEVICE ATTRIBUTE SELECT screen 674. Depending on the attribute selected, the system displays screens 696, 684, 686, or 688, which are used as discussed above.

Commissioning screens 700 are shown at the bottom of FIG. 22. Each new device has a commissioning button, which is on a commissioning screen if it is a touchscreen, and a hardware button otherwise. If system 120 has never been commissioned, or if system 120 is reset, screen 720 having a commissioning button is displayed. When the commissioning button is pressed, TIME/DATE EDIT screen 690 is displayed. When the time and date are entered, this is accepted as the commissioning date and sent to all devices in the system. A NEW DEVICE COMMISSION screen 704 is then displayed on the default program screen. The device to be programmed is selected on screen 704, which causes a NEW DEVICE ROOM NAME screen 706 to be displayed on which the room in which the device is located can be selected. If the room is not present on screen 706, NEW DEVICE ROOM NAME ADD screen 708 is selected and displayed. A new room name can be entered on this screen, and the system then goes to NEW DEVICE LOCATION NAME screen 710. Once the new device location is entered, the device is commissioned and COMMISSION DEVICE screen 712 is displayed which allows a new device to be commissioned to be selected. If a new device is added, NEW DEVICE PRESS-TO-COMMISSION screen 702 is displayed. When the commission button on this screen is pressed, NEW DEVICE COMMISSION screen 704 is displayed on the default touchscreen user interface unit and the commissioning proceeds as described above.

Many other subsystems can be included in system 120 according to the invention. For example, preferably, building automation system 120 further includes a phone interface that provides the function of dialing an alarm monitoring company and playing a pre-recorded message. Also preferably, building automation system 120 accepts incoming calls to control the system from a remote location either by voice, tone, or digital modem signaling. User interface units 162 preferably include the capability to serve as speakerphones with a central phone number directory. The system can be used to control electronic door locks from any room in the house. Pool/spa controls, such as heating, chemical additives, and filters, aquarium controls for heating and filters, and other water features such as fountains and waterfalls are just some of the capabilities of the system.

A feature of the invention is that the programming system of building automation system 120 is symmetrical in design, meaning in the case where level control 140 is controlling lighting fixture 142, a user can go into the program and look at either lighting fixture 142 or level control 140 and change that interaction.

Building automation system 120 can be wired into existing homes or buildings that are pre-wired with low voltage control trunk 170. For installation into these homes or buildings, low voltage control trunk 170 is routed to the switch boxes in the existing house or building. The existing switch boxes are replaced with power drivers 127, 143, and 158 at that location and at that spot. Low voltage control trunk 170 goes to the actual switch location. For example, if you have four lights controlled by four level controls on the wall, then a power driver 127 would be put in place of the existing level controls and then a user interface unit 201, preferably a level control 140 or touchscreen 162, is placed over or near the power driver.

Furthermore, building automation system 120 can be wired into existing homes or buildings that do not include low voltage control trunks 170. In this scenario, power drivers 202 are installed in place of the existing switch plate and a user interface units 132, 162, or 140 are located above it. Because no low voltage control wiring is in place in this scenario, RF or other wireless circuitry added to interface units 132, 162, or 140 is used to provide the same functional control over the electrical devices. The existing AC wiring is routed to power drivers 202. User interface units 132, 136, 152, and 162 or level control 140 then communicate to controller 122, which also includes RF or other wireless circuitry.

A feature of the invention is that the functional connection of electrical devices is totally independent of the way in which they are wired. So long as every electrical device is attached to a driver connected to one of control trunks 170, it can be used in building automation system 120 in any manner the user desires. Thus, when installing an electrical system in a house, the electrical contractor only needs to be sure each electrical device is connected to a driver 202 that is connected to a trunk. User interface units 201 do not have to be associated with any particular device, but can be placed in the building as efficient and convenient control dictates.

All electronic elements in the system, including user interfaces 201, drivers 202, controller module 526, and cabinet 172, are available in designer and fashion colors that coordinate with receptacles, cable and TV jacks, and other accessory wall plates.

There has been described a novel and efficient building automation system. It should be understood that the particular embodiments shown in the drawings and described within this specification are for purposes of example and should not be construed to limit the invention. Further, it is evident that those skilled in the art may now make numerous uses and modifications of the specific embodiment described, without departing from the inventive concepts. It is also evident that the processes recited may in some instances be performed in a different order, or equivalent structures and processes may be substituted for the various structures and processes described. The structures and processes may be combined with a wide variety of other structures and processes.

I claim:

1. A building automation system comprising:
a plurality of programmable user interface units, each of said user interface units located in a room or associated area of a building;
a plurality of power drivers, each of said power drivers located in a room or associated area of said building;
a plurality of electrical devices, each of said electrical devices electrically connected to one of said power drivers, said electrical devices comprising a plurality of different types of devices selected from the group consisting of lighting fixtures, fans, security systems, audio/video systems, heating systems, air conditioning systems, garage doors, garage door sensors, doorbells, window controls, sprinkler controls, garage door openers, electronic gate openers, driveway heaters, sidewalk heaters, fireplace controls, intercoms, speakers, microphones, dampers, digital cameras, hot water heaters, telephones, aquarium controls, water feature controls, pool/spa controls, fire protection systems, thermostats, and switched outlets;
a controller comprising a processor and a memory; and
an electrical signal trunk connected to said controller;
wherein each of said user interface units and each of said power drivers are connected to said electrical signal trunk.

2. A building automation system as in claim 1 wherein said user interface units include a touchscreen.

3. A building automation system as in claim 2 wherein said user interface units include a button separate from said touchscreen, said button adapted to control an electrical device in the room or associated area in which said user interface unit is located.

4. A building automation system as in claim 3 wherein said electrical device is a lighting fixture.

5. A building automation system as in claim 3 and further including a light for illuminating said button.

6. A building automation system as in claim 2 wherein said touchscreen displays a scene screen object for controlling a plurality of said electrical devices with a single touch.

7. A building automation system as in claim 2 wherein said touchscreen displays a program screen object enabling the user to program any controllable electrical device in said building or associated areas.

8. A building automation system as in claim 2 wherein said touchscreen displays screen objects for accessing three or more functions selected from the group consisting of: time, date, temperature, weather, security, intercom, audio, and sprinklers.

9. A building automation system as in claim 2 wherein said touchscreen displays a rooms screen object for displaying a listing of said rooms and associated areas of said building.

10. A building automation system as in claim 2 wherein said touchscreen displays a screen object for displaying a list of all controllable electrical devices in said rooms and associated areas of said building.

11. A building automation system as in claim 1 wherein each of said user interface units is capable of controlling each of said power drivers.

12. A building automation system as in claim 1 and further including an electrical circuit panel and an electrical power conductor connected between said electrical circuit panel and each of said power drivers.

13. A building automation system as in claim 1 wherein said electrical signal trunk is a low voltage control wiring.

14. A building automation system as in claim 13 wherein said low voltage control wiring is CAT5 cable.

15. A building automation system as in claim 1 and further including a wireless remote control, wherein said wireless remote control controls only the electrical devices in the room in which it is located.

16. A building automation system as in claim 15 wherein said wireless remote control further includes a selector button, wherein operating said selector button changes the electrical device controlled by said wireless remote control.

17. A building automation system as in claim 16 wherein said wireless remote control further includes up/down buttons, wherein selecting the up/down buttons adjusts the electrical output to said selected electrical device.

18. A building automation system as in claim 15 wherein said wireless remote control further includes a flashlight and a flashlight activation button.

19. A building automation system as in claim 15 wherein said wireless remote control controls electrical devices throughout said building.

20. A building automation system as in claim 15 wherein said wireless remote control transmits radio frequency (RF) signals.

21. A building automation system as in claim 15 wherein said wireless remote control transmits infrared (IR) signals.

22. A building automation system as in claim 1 wherein each of said power drivers control AC power to a plurality of electrical devices.

23. A building automation system as in claim 1 wherein said user interfaces include a level control for controlling the level of power applied to an electrical device.

24. A building automation system as in claim 23 wherein said electrical device is selected from the group consisting of a lighting fixture and a motor.

25. A building automation system as in claim 23 wherein said level control includes a bar graph device for indicating the power level at which said level control is set.

26. A building automation system comprising:
   a controller comprising a microprocessor and a memory;
   a plurality of programmable user interface units, each of said user interface units located in a room in a building;
   each user interface unit comprising: a touchscreen, a speaker, and a microphone;
   each user interface unit is capable of controlling an electrical device in a room in which said controller is located; and
   each user interface unit is capable of controlling an electrical device in a room different than the room in which said controller is located.

27. A building automation system as in claim 26 wherein each user interface unit further includes a camera.

28. A building automation system as in claim 26 wherein each user interface unit further includes a motion detector.

29. A building automation system as in claim 26 wherein at least one user interface unit receives radio frequency (RF) signals.

30. A building automation system as in claim 26 wherein at least one user interface unit receives radio frequency (RF) signals.

* * * * *